US008149722B2

(12) United States Patent  
Mera et al.

(10) Patent No.: US 8,149,722 B2  
(45) Date of Patent: Apr. 3, 2012

(54) METHOD AND APPARATUS FOR DETECTING VPN COMMUNICATION

(75) Inventors: Keisuke Mera, Kawasaki (JP); Naoki Esaka, Yokohama (JP); Shigeo Matsuzawa, Chofu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 718 days.

(21) Appl. No.: 11/716,883

(22) Filed: Mar. 12, 2007

(65) Prior Publication Data

US 2007/0280247 A1 Dec. 6, 2007

(30) Foreign Application Priority Data

Mar. 13, 2006 (JP) ................................. 2006-068004

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)
*G06F 15/177* (2006.01)
*G06F 15/173* (2006.01)

(52) U.S. Cl. ........ 370/248; 370/249; 370/253; 370/254; 370/389; 370/295.53; 370/401; 709/220; 709/223

(58) Field of Classification Search .................. None
See application file for complete search history.

(56) References Cited

U.S. PATENT DOCUMENTS

| 6,914,886 | B2 * | 7/2005 | Peles et al. ..................... 370/254 |
| 2005/0088977 | A1 * | 4/2005 | Roch et al. ..................... 370/254 |
| 2005/0160450 | A1 * | 7/2005 | Stephens et al. ................ 725/35 |
| 2005/0268335 | A1 * | 12/2005 | Le et al. .......................... 726/13 |
| 2006/0041642 | A1 * | 2/2006 | Rosner et al. ................. 709/220 |
| 2006/0153153 | A1 * | 7/2006 | Bhagwat et al. ............... 370/338 |
| 2010/0042708 | A1 * | 2/2010 | Stamler et al. ................ 709/221 |

OTHER PUBLICATIONS

Net Agent Co., Ltd., "One Point Wall," dated Jun. 12, 2006 (for more see http://www.onepointwall.jpl).

* cited by examiner

*Primary Examiner* — Nishant Divecha
(74) *Attorney, Agent, or Firm* — Ohlandt, Greeley, Ruggiero & Perle, L.L.P.

(57) ABSTRACT

A VPN (Virtual Private Network) communication detecting apparatus connecting to an internal network for detecting a VPN node on an external network which connects to the internal network through a relay apparatus, transmits response request packet to test target node, receives response packet from the test target node in response to the response request packet, measures response time which is from first time point when the response request packet is transmitted to second time point when the response packet is received, and determines whether the test target node is the VPN node, based on correlation between the response time and delay time inserted by the relay apparatus when test target packet pass through the relay apparatus, the test target packet, if the test target node is the other of the VPN nodes, including the response request packet or the response packet.

10 Claims, 25 Drawing Sheets

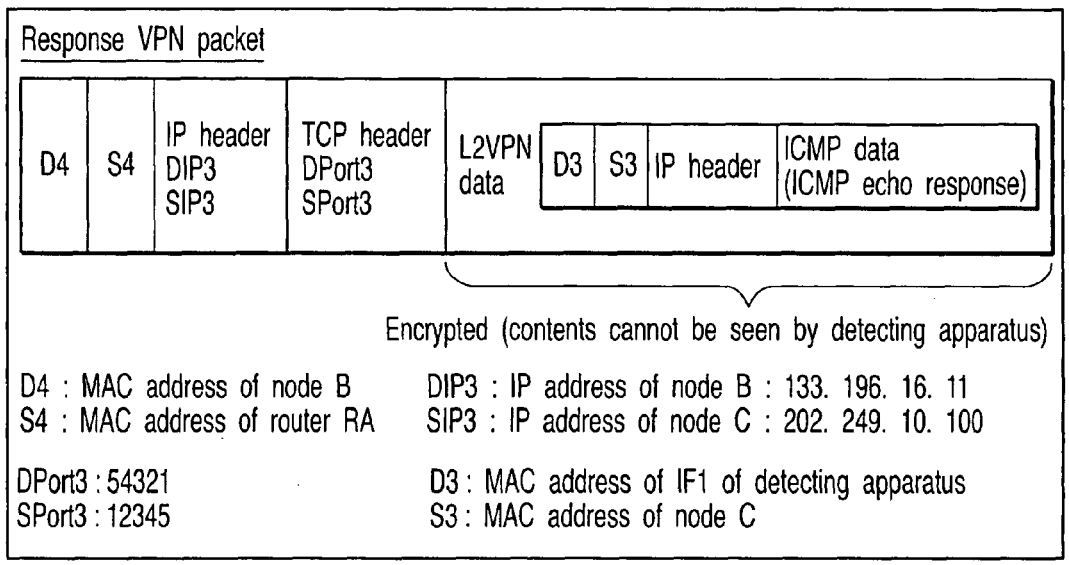
FIG. 15
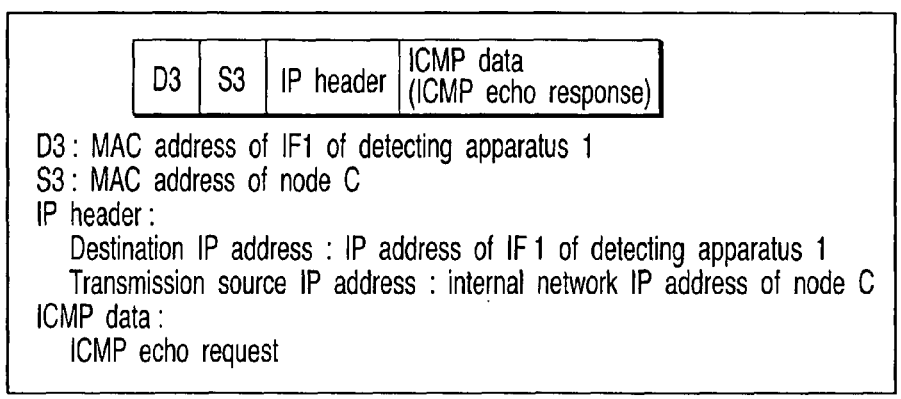
FIG. 16
| Delay time α [sec] | Average [sec] of response time β |
|---|---|
| 0.00 | 0.01 |
| 0.20 | 0.21 |
| 0.25 | 0.26 |
FIG. 17

Connection control table

| ID | Destination IP address | Transmission source IP address | Protocol number | Destination port number | Transmission source port number |
|---|---|---|---|---|---|
| ID1 | 202.249.10.101 | 133.196.16.10 | 6(TCP) | 80 | 18000 |
| ID2 | 133.196.16.10 | 202.249.10.101 | 6(TCP) | 18000 | 80 |
| ID3 | 202.249.10.100 | 133.196.16.11 | 6(TCP) | 12345 | 54321 |
| ID4 | 133.196.16.11 | 202.249.10.100 | 6(TCP) | 54321 | 12345 |
| ID5 | 133.196.16.10 | 202.249.10.200 | 17(UDP) | 53 | 35000 |
| ID6 | 202.249.10.200 | 133.196.16.10 | 17(UDP) | 35000 | 53 |

F I G. 20

| Process number | Packet identification information | Delay time α [sec] | Number of times of transmission of detection packet |
|---|---|---|---|
| 1 | ID1 | 0.00 | 10 |
| 2 | ID1 | 0.20 | 10 |
| 3 | ID2 | 0.00 | 10 |
| 4 | ID2 | 0.20 | 10 |
| 5 | ID3 | 0.00 | 10 |
| 6 | ID3 | 0.20 | 10 |
| 7 | ID4 | 0.00 | 10 |
| 8 | ID4 | 0.20 | 10 |

FIG. 27

| Process number | Packet identification information | Delay time α [sec] | Average [sec] β | Detection result |
|---|---|---|---|---|
| 1 | 1 | 0.00 | 0.01 | Failure |
| 2 | 1 | 0.20 | 0.01 | Failure |
| 3 | 2 | 0.00 | 0.01 | Failure |
| 4 | 2 | 0.20 | 0.01 | Failure |
| 5 | 3 | 0.00 | 0.01 | Success |
| 6 | 3 | 0.20 | 0.21 | Success |
| 7 | 4 | 0.00 | 0.01 | Success |
| 8 | 4 | 0.20 | 0.21 | Success |

FIG. 28

| Process number | Packet to be discarded | Number of times of transmission of detection packet |
|---|---|---|
| 1 | (None) | 10 |
| 2 | ID1 | 10 |
| 3 | (None) | 10 |
| 4 | ID2 | 10 |
| 5 | (None) | 10 |
| 6 | ID3 | 10 |
| 7 | (None) | 10 |
| 8 | ID4 | 10 |

FIG. 30

| Process number | Identification information of discarded packet | Number of times of transmission of detection packet | Reception ratio (%) of response packet | Detection result |
|---|---|---|---|---|
| 1 | (None) | 10 | 100 | Failure |
| 2 | ID1 | 10 | 100 | Failure |
| 3 | (None) | 10 | 100 | Failure |
| 4 | ID2 | 10 | 100 | Failure |
| 5 | (None) | 10 | 100 | Success |
| 6 | ID3 | 10 | 0 | Success |
| 7 | (None) | 10 | 100 | Success |
| 8 | ID4 | 10 | 0 | Success |

FIG. 31

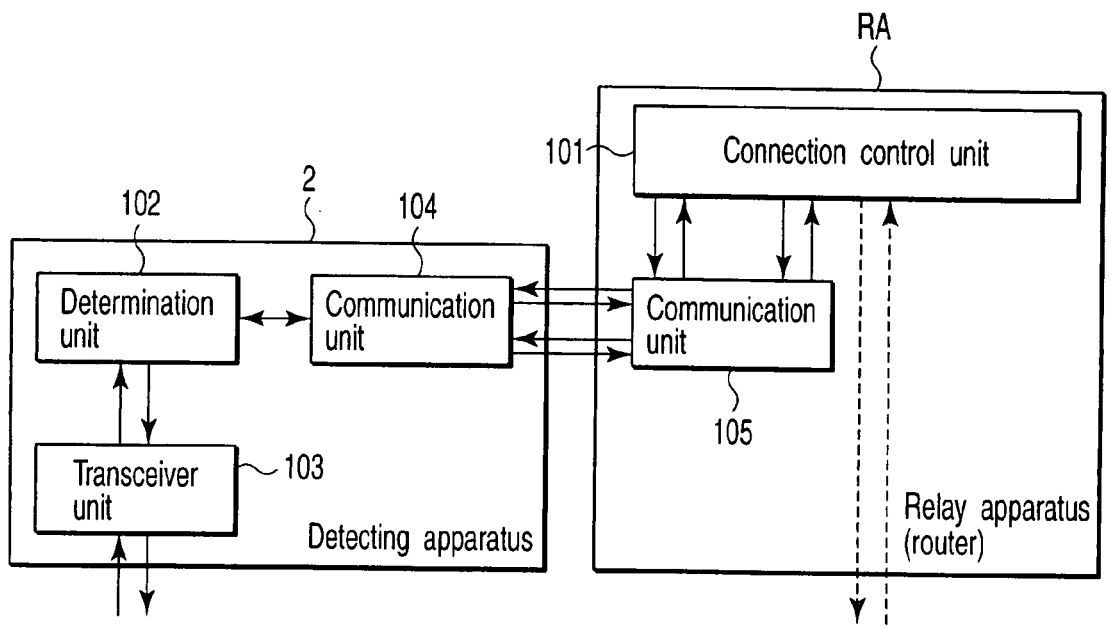
F I G. 3 2
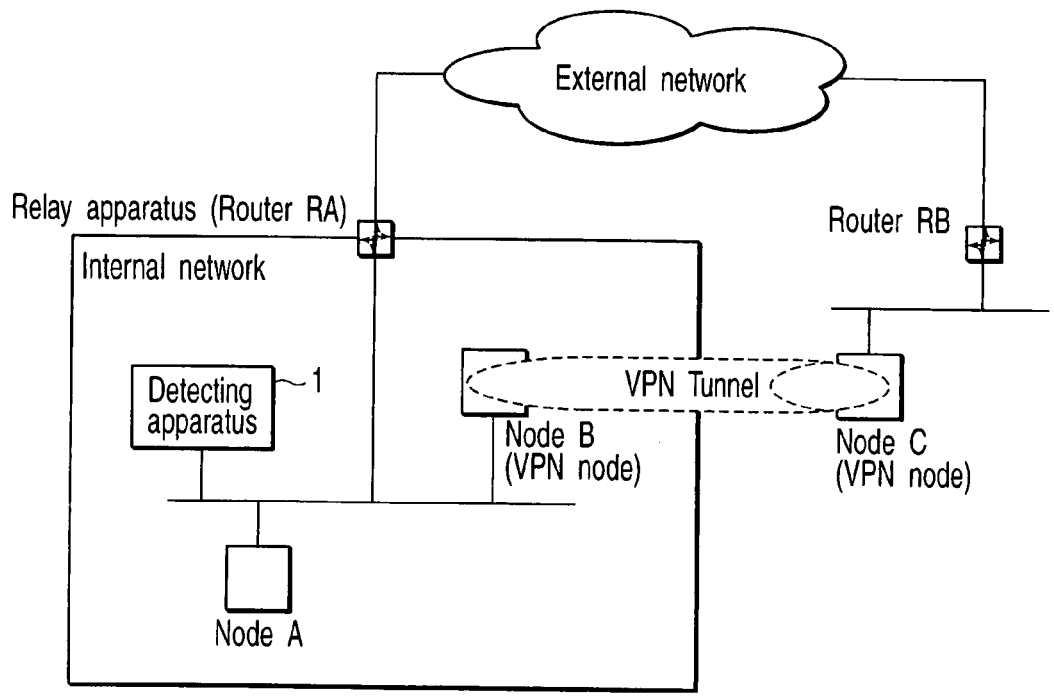
F I G. 3 3

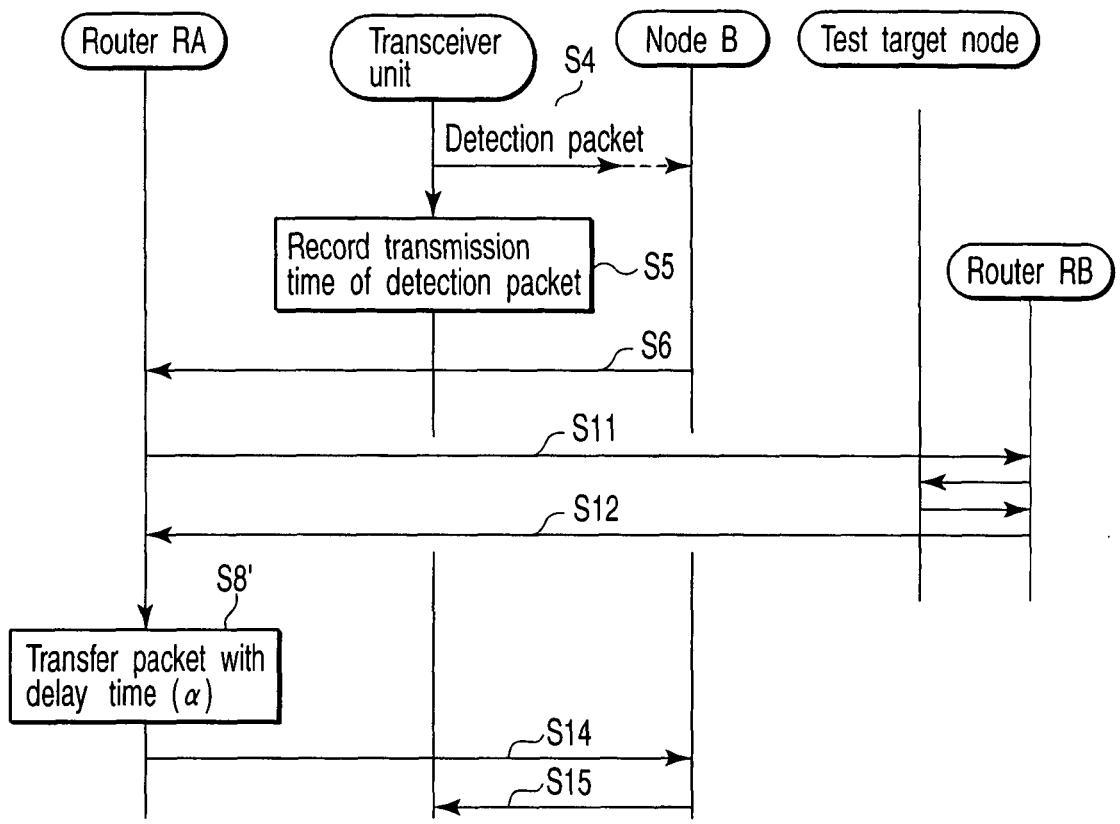
F I G. 36

METHOD AND APPARATUS FOR DETECTING VPN COMMUNICATION

CROSS-REFERENCE TO RELATED APPLICATIONS

This application is based upon and claims the benefit of priority from prior Japanese Patent Application No. 2006-068004, filed Mar. 13, 2006, the entire contents of which are incorporated herein by reference.

BACKGROUND OF THE INVENTION

1. Field of the Invention

The present invention relates to a Virtual Private Network (VPN) and, more particularly, to a method and apparatus for detecting a node on an external network which is performing VPN communication with a node on an internal network.

2. Description of the Related Art

The forms of connecting basic networks in remote places include a technique called Virtual Private Network (VPN).

Layer 3 VPN (L3VPN) is a technique of constructing a virtual network on a real network by performing "encapsulation", i.e., storing an IP packet in an IP packet in the real network. This technique is sometimes called IP-VPN, Internet VPN, or the like. However, L3VPN, which is VPN in the form of transferring an IP packet upon encapsulation, cannot handle any packets that use protocols other than IP, and demands special consideration in handling broadcast and multicast communication.

The forms of connecting bases in remote places include a technique called Layer 2 Virtual Private Network (L2VPN). In general, bases in remote places belong to different networks. According to this technique, however, Layer 2 frames (e.g., Ethernet® frames) are encapsulated on an upper layer and transferred between the remote places, thereby making this system look like one virtual Layer 2. This technique makes it possible to facilitate unifying policies and the like and reduce the load on the administrator, and allows a user to belong to the same network regardless of his/her location.

In some cases, a business or governmental organization limits external access through VPN for the prevention of information leakage. There is available an apparatus for detecting VPN communication passing through a firewall (see, e.g., "One Point Wall", Net Agent Co., Ltd) to grasp or regulate a host which is externally accessing an internal network through VPN.

This is a firewall apparatus which is characterized by monitoring the packet pattern of a communication passing through the apparatus and determining VPN connection if the pattern of the communication is that using a known VPN protocol.

If the internal network is externally accessed through VPN, the VPN communication always passes through a relay apparatus such as a router which connects to the outside. If, therefore, the VPN communication is a known VPN protocol, monitoring a passing packet makes it possible to determine whether the packet is a VPN communication packet.

However, since most VPN communications are encrypted, it is difficult to detect VPN communication only by observing a passing packet.

The above firewall apparatus described in "One Point Wall", which is designed to detect a VPN communication packet by monitoring a communication packet pattern, can detect a communication using a known VPN protocol as a VPN communication if the communication packet pattern coincides with a known pattern even if the communication is encrypted.

It is, however, impossible to detect a VPN communication packet pattern unless the firewall apparatus already knows the pattern. For this reason, the firewall apparatus cannot detect any VPN communication packet for VPN communication based on protocols which the apparatus does not know, e.g., a VPN protocol newly developed by a firewall apparatus and modified VPN protocols.

The widespread use of computers and improvements in high-speed always-on networks has allowed users to casually use VPN. On the other hand, there are requirements for inhibiting any devices other than those in a house from connecting to a device installed in the house for the sake of copyright protection.

There has been proposed a technique of using RTT (Round Trip Time) in the standardization of DTCP (Digital Transmission Content Protection)/IP to detect whether a given communication partner (node) is accessing through VPN. However, the above situation cannot be handled by this technique alone.

In addition, the above firewall apparatus described in "One Point Wall", which is designed to detect a VPN communication packet, can detect a VPN communication packet by using a known VPN protocol by monitoring passing communications. Even if the apparatus can detect a VPN communication packet, it cannot detect a node which connects through VPN.

As described above, the conventional apparatus cannot easily detect a node on an external network which is performing VPN communication with a node on an internal network.

Another problem is that this apparatus cannot easily detect any packet, of communication packets transmitted/received between a node on an internal network and a node on an external network, which is used for VPN communication regardless of whether the VPN protocol is known.

BRIEF SUMMARY OF THE INVENTION

According to a embodiment of the present invention, a VPN (Virtual Private Network) communication detecting apparatus for detecting a VPN communication between two VPN nodes, one of the VPN nodes being on an internal network and the other of the VPN nodes being on an external network which connects to the internal network through a relay apparatus, the VPN communication detecting apparatus which connects to the internal network includes:

a transmission unit configured to transmit a response request packet to a test target node;

a reception unit configured to receive a response packet from the test target node in response to the response request packet;

a measurement unit configured to measure a response time which is from a first time point when the response request packet is transmitted to a second time point when the response packet is received; and a determination unit configured to determine whether the test target node is the other of the VPN nodes, based on a correlation between the response time and a delay time inserted by the relay apparatus when a test target packet pass through the relay apparatus, the test target packet, if the test target node is the other of the VPN nodes, including the response request packet or the response packet.

According to another embodiment of the present invention, a VPN (Virtual Private Network) communication detecting apparatus for detecting a VPN communication between two VPN nodes, one of the VPN nodes being on an internal network and the other of the VPN nodes being on an external network which connects to the internal network through a relay apparatus, the VPN communication detecting apparatus which connects to the internal network includes:

a switching unit configured to switch the relay apparatus to one of a packet discarding mode of discarding at least one of packets each transmitting from one of the internal network and the external network to the other of the internal network and the external network and a normal mode of not discarding any packet;

a transmission unit configured to transmit a first response request packet to a test target node when the relay apparatus is in the packet discarding mode and transmit a second response request packet to the test target node when the relay apparatus is in the normal mode;

a first detection unit configured to detect whether a first response packet is received from the test target node in response to the first response request packet;

a second detection unit configured to detect whether a second response packet is received from the test target node in response to the second response request packet; and a determination unit configured to determine, based on detection results obtained by the first and the second detection units, whether the test target node is the other of the VPN nodes.

BRIEF DESCRIPTION OF THE SEVERAL VIEWS OF THE DRAWING

FIG. 15 is a view showing an example of a response VPN packet addressed to the node B, which contains a response packet;

FIG. 16 is a view showing an example of a response packet;

FIG. 17 is a view for explaining determination processing by a determination unit, which shows an example of the totalization result on response times $\beta$ measured while the duration of a delay time is changed;

FIG. 20 is a view showing an example of a connection control table storing the packet attribute information obtained as a result of connection monitoring processing;

FIG. 27 is a view showing the contents of processing to be executed for each test target packet to detect VPN communication by using the third detecting method, and more specifically, a delay time for each test target packet when it passes through and the number of times of transmission of a detection packet when the delay time is inserted;

FIG. 28 is a view showing the detection result of VPN communication obtained when the detecting apparatus performs the processing shown in FIG. 27;

FIG. 30 is a view showing the contents of processing to be executed for each test target packet to detect VPN communication by using the fourth detecting method, and more specifically, test target packets to be discarded and the numbers of times of transmission of detection packets when the test target packets are discarded;

FIG. 31 is a view showing a detection result on VPN communication obtained by causing the detecting apparatus to perform the processing shown in FIG. 30;

FIG. 32 is a view showing an example of the arrangement of a detecting apparatus according to the second embodiment;

FIG. 33 is a view showing an example of a network arrangement according to the second embodiment;

FIG. 36 is a sequence chart for explaining the flow of data in a network in a case wherein the first detecting method is applied to the detecting apparatus and relay apparatus according to the second embodiment, which shows a case wherein a test target node is a node on the internal network;

DETAILED DESCRIPTION OF THE INVENTION

The embodiments of the present invention will be described below with reference to the views of the accompanying drawing.

An outline of VPN communication and problems in conventional techniques associated with the detection of a node which is performing VPN communication will be described first with reference to FIGS. 1 to 5.
(Outline of VPN Communication)

Figure 1:
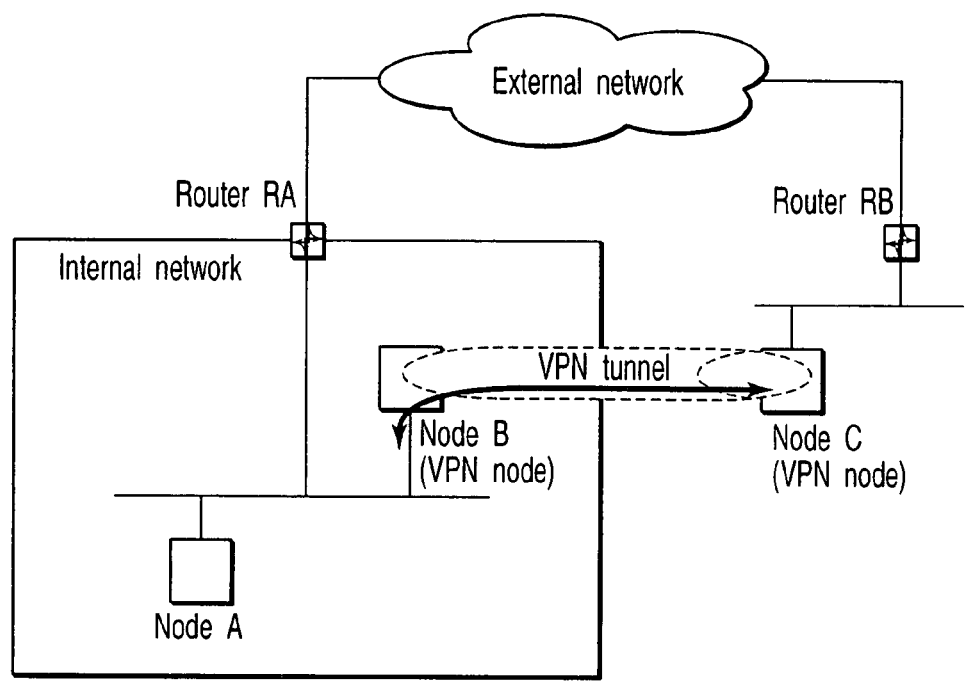
FIG. 1 is a view for explaining VPN communication.

As shown in FIG. 1, when a node B is performing VPN (tunnel) communication with a node C, a network packet is transferred between the node C or a network to which the node C physically connects and an internal network through a VPN tunnel.

Figure 2:
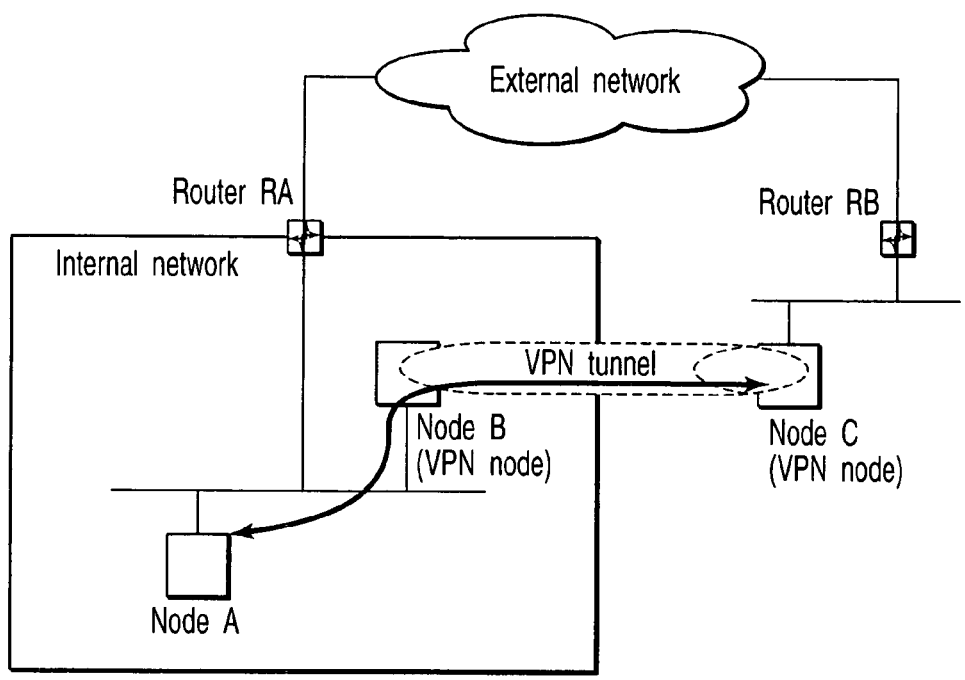
FIG. 2 is a view for explaining VPN communication, which shows the flow of a packet when viewed from the internal network.

FIG. 2 is a view showing the flow of a packet during communication between a node A and the node C, which is indicated by the arrows, as an example of the flow of a packet through a VPN tunnel. From the viewpoint of nodes on the internal network which includes the node A, it looks as if the node C or the network to which the node C connects can be accessed through the node B (this route to the node C is indicated as a virtual tunnel in FIGS. 1 and 2).

Figure 3:
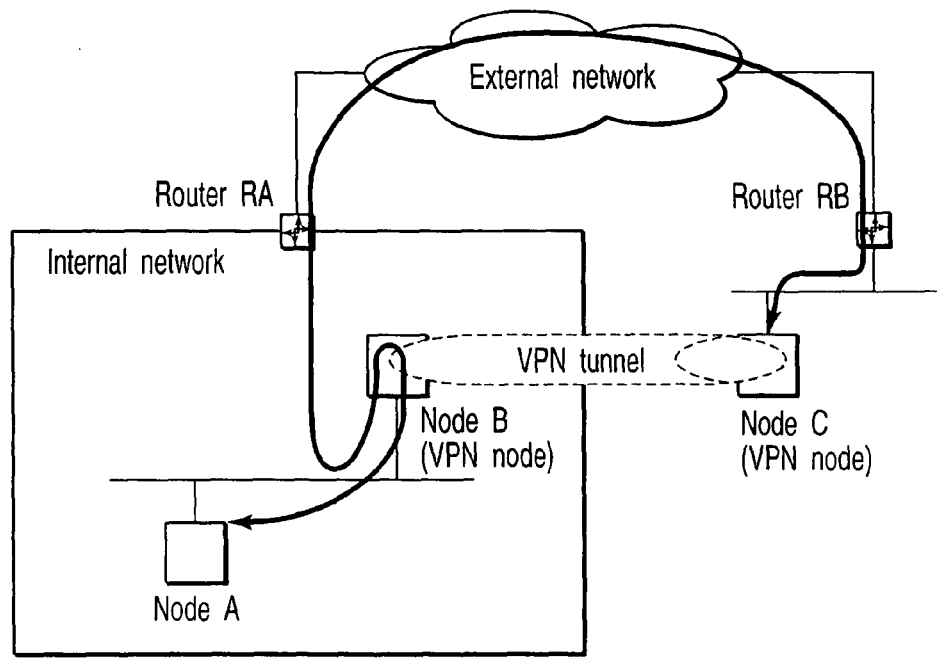
FIG. 3 is a view for explaining VPN communication, which shows the actual flow of a packet.

As shown in FIG. 3, however, actual VPN communication is performed with the external network through a router RA. That is, a packet addressed to the node C and transmitted from the node A reaches the node B first. The node B encapsulates the received packet addressed to the node C into a VPN packet, and transmits the VPN packet. The VPN packet is transmitted to the external network through the router RA and reaches the node C. The node C extracts the packet transmitted by the node A from the received VPN packet. This is equivalent to the packet being transmitted from the node A and reaching the node C.

Encapsulating makes it possible to virtually connect the node C through a VPN tunnel, as shown in FIG. 2.
(Detection of Node Connected by L3VPN)

A problem which arises in the detection of a node connected by L3VPN will be described as an example. From a virtual point of view, an external node communicates with an internal node is performed through a tunnel. In reality, however, the router RA allows exchange of an encapsulated packet with the external node.

Figure 4:
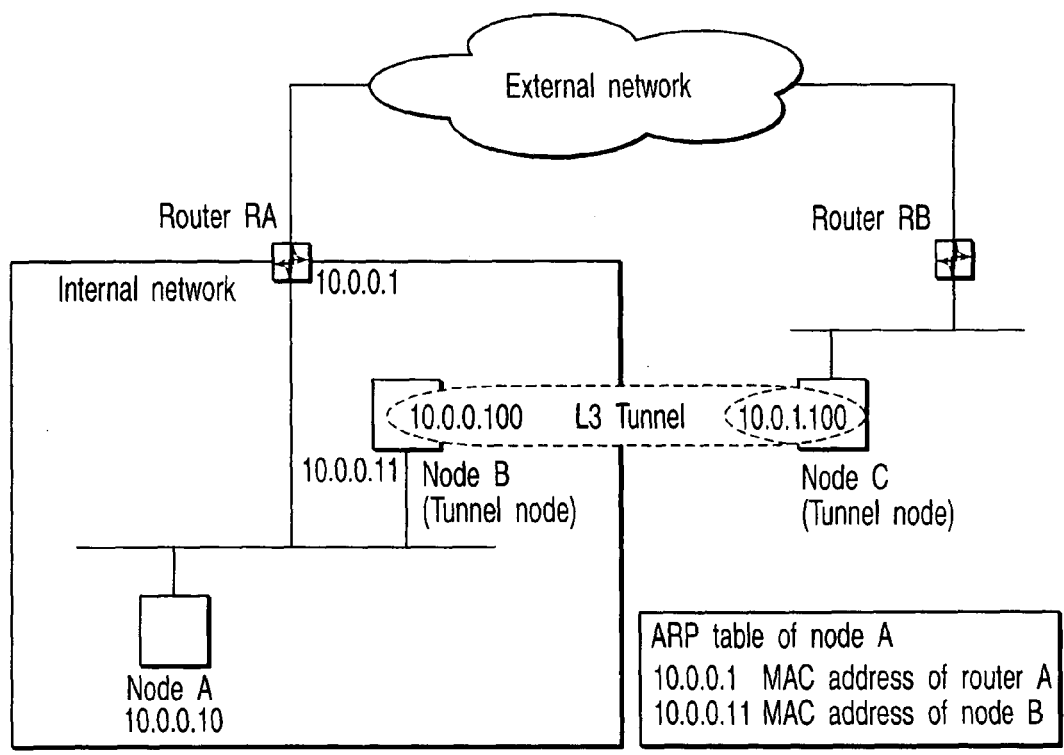
FIG. 4 is a view schematically showing a state wherein a node C accesses the internal network by using L3VPN, in which the node C is assigned an address of an address block different from that for the internal network.

FIG. 4 shows an example of a network arrangement in a case wherein the node C is accessing the internal network by using L3VPN.

The internal network operates using the address block "10.0.0.0/24". When connecting by L3VPN, the node C needs to be assigned an address block different from that for the internal network, and hence the tunnel end point of the node C is assigned, for example, an IP address of the address block "10.0.1.0/24".

When the node C accesses a node (e.g., the node A) on the internal network, a packet from the node C propagates through the tunnel, is transferred to the internal network by the node B, and reaches the node A, from a virtual point of view. In contrast, a packet from the node A to the node C is transferred to the tunnel by the node B and reaches the node C through the tunnel.

Many L3VPN schemes are not designed to transfer any ARP protocol packet used for checking a MAC address from an IP address in Ethernet®. For this reason, even if an IP address of the IP address block of the internal network is assigned to the node C, since the node C cannot transmit any ARP response, the node cannot inform a node on the internal network of the MAC address. Therefore, the node on the internal network cannot access the node C.

In this arrangement, although the IP address of the node C does not match the IP addresses of the internal network, it cannot be determined from a difference in IP address that a given node belongs to the internal network. This is because in the internal network, a subnet assigned another IP address block may be operated.

If a proxy ARP function operates in the node B, assigning an address of the same address block as that of the internal network to the node C allows the node to perform communication.

Figure 5:
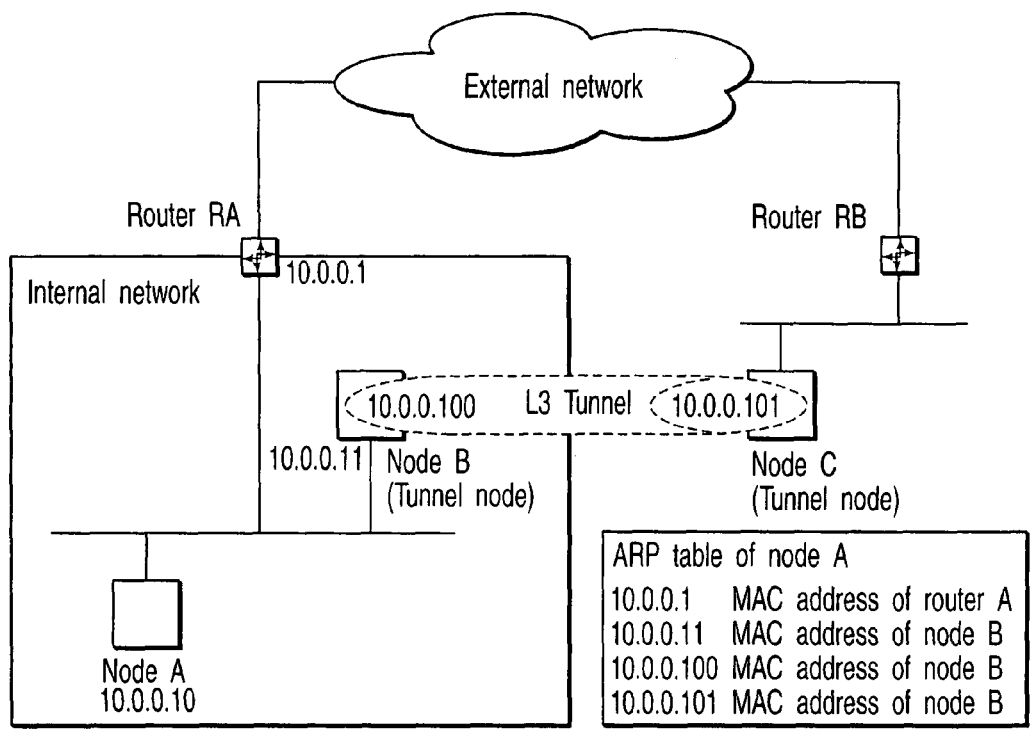
FIG. 5 is a view schematically showing a state wherein the node C accesses the internal network by using L3VPN, in which the node C is assigned an address of an address block for the internal network.

FIG. 5 shows an example of how the node C connects to the internal network by using L3VPN. Unlike in the arrangement shown in FIG. 4, in the arrangement shown in FIG. 5, an address of the address block of the internal network is set for the node C.

When the node B receives an ARP packet for inquiring about a MAC address with respect to the IP address of the node C, the proxy ARP function of the node B transmits a response indicating that the MAC address of the node C matches the MAC address of the node B.

This means that all packets addressed to the node C are transmitted to the node B. Upon receiving a packet addressed to the IP address of the node C, the node B transfers the packet to the node C through the tunnel. In contrast, a packet addressed from the node C to the internal network is transferred to the node B through the tunnel, and the node B transfers the packet to the internal network.

Assume that L3VPN is used, and the IP addresses of the two ends of a VPN tunnel are different subnet addresses. In this case, it can be known from a difference in IP address that the corresponding node does not exist in the same subnet. However, this may indicate that another subnet operates in the internal network and no node externally connects to the internal network through VPN. It cannot therefore be detected from only a difference in IP address.

In addition, the IP addresses of the two ends of a VPN tunnel can be assigned to the same subnet address while L3VPN is used (this scheme will be described in detail later). In this arrangement, although a MAC address corresponding to the IP address of a node which connects through VPN coincides with the MAC address of a node which terminates VPN in the internal network, this does not allow to determine that external access is made through the tunnel. There is still a chance that a plurality of IP addresses are assigned to the node B, or that the node C exists in the internal network and is performing communication through the tunnel within the internal network.

The above description has exemplified the case wherein the internal network uses IPv4 (Internet Protocol version 4). However, similar problems arise in VPN detection when the internal network uses another network protocol, such as IPv6 (Internet Protocol version 6).

(Detection of Node Connected by L2VPN)

A case wherein L2VPN is used for tunnel communication in the above network arrangement will be described.

Apparently, other terminals are not conscious of the use of L2VPN. Not only a unicast frame but also, for example, a broadcast frame is transferred to another network through the L2 tunnel, as shown in FIG. 2 (e.g., a name solution sequence by broadcasting in Windows® or a device discovery sequence using multicasting by UPnP®)).

As shown in FIG. 3, however, in reality, a router having a route to an upstream network transfers all packets propagating through the L2VPN tunnel.

When a given node is externally accessed by L2VPN, an Ethernet® Layer 2 frame or the like can be transferred. This can make it look as if a node directly connects to the internal network even though it connects to it through VPN. For this reason, conventional techniques cannot provide effective means for determination on whether external connection is made through L2VPN.

(Premise)

An example of a network arrangement used for the description of the following embodiments will be described next. In this case, the embodiments are premised on a network which satisfies the following conditions:

Communication with an external network, e.g., VPN communication, always passes through a detecting apparatus or a relay apparatus such as a router. Assume that no connection can be made to an external network without a detecting apparatus or a relay apparatus. If there are a plurality of routes to the outside, detecting apparatuses or relay apparatuses are respectively arranged in such routes, and they are made to operate in cooperation with each other (the detecting apparatuses or the relay apparatuses will be described in detail later).

An internal network is a network which connects under the control of a detecting apparatus or a relay apparatus, and is configured to access an external network through the detecting apparatus or the relay apparatus.

A node which exists in an internal network and terminates VPN transfers a packet between the internal network and a VPN tunnel. The embodiments are not based on the assumption that a node which terminates VPN is so set as not to transfer any packet to the internal network.

A node as a test target returns a response to a detecting apparatus in response to a response request from the detecting apparatus. Examples of communication protocols for issuing response requests include ICMPecho, ARP, and ICMPv6ND.

First Embodiment

1. Detecting Apparatus

Figure 6:
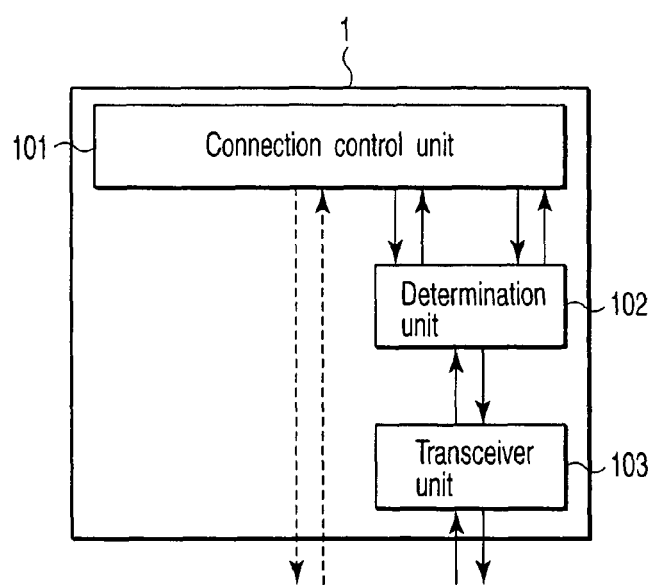
FIG. 6 is a block diagram showing an example of the arrangement of a detecting apparatus according to the first embodiment.

FIG. 6 shows an example of the arrangement of a detecting apparatus 1 according to the first embodiment. The detecting apparatus 1 in FIG. 6 includes a connection control unit 101, determination unit 102, and transceiver unit 103.

The connection control unit 101 monitors a connection passing through a router, controls a delay inserted in the transfer of a packet as needed, and controls whether to transfer a packet. Connection monitoring is a function of acquiring the type of packet passing through the router, i.e., packet attribute information. For example, according to Linux®, this function corresponds to "iptables" and "tc(iproute2)". This function makes it possible to insert an arbitrary delay and discard an arbitrary packet.

The determination unit 102 issues, to the connection control unit 101, an instruction to delaying a packet, an instruction to discard a packet, and an instruction to cancel the above instructions. In addition, the determination unit 102 issues, to the transceiver unit 103, an instruction to transmit a determination packet, and determines on the basis of both the results whether the corresponding packet is a packet passing through the tunnel.

The transceiver unit 103 transmits a determination packet to the internal network in accordance with a request from the determination unit 102, and receives a response. The transceiver unit 103 then measures the time taken to receive the response from the internal network.

Figure 7:
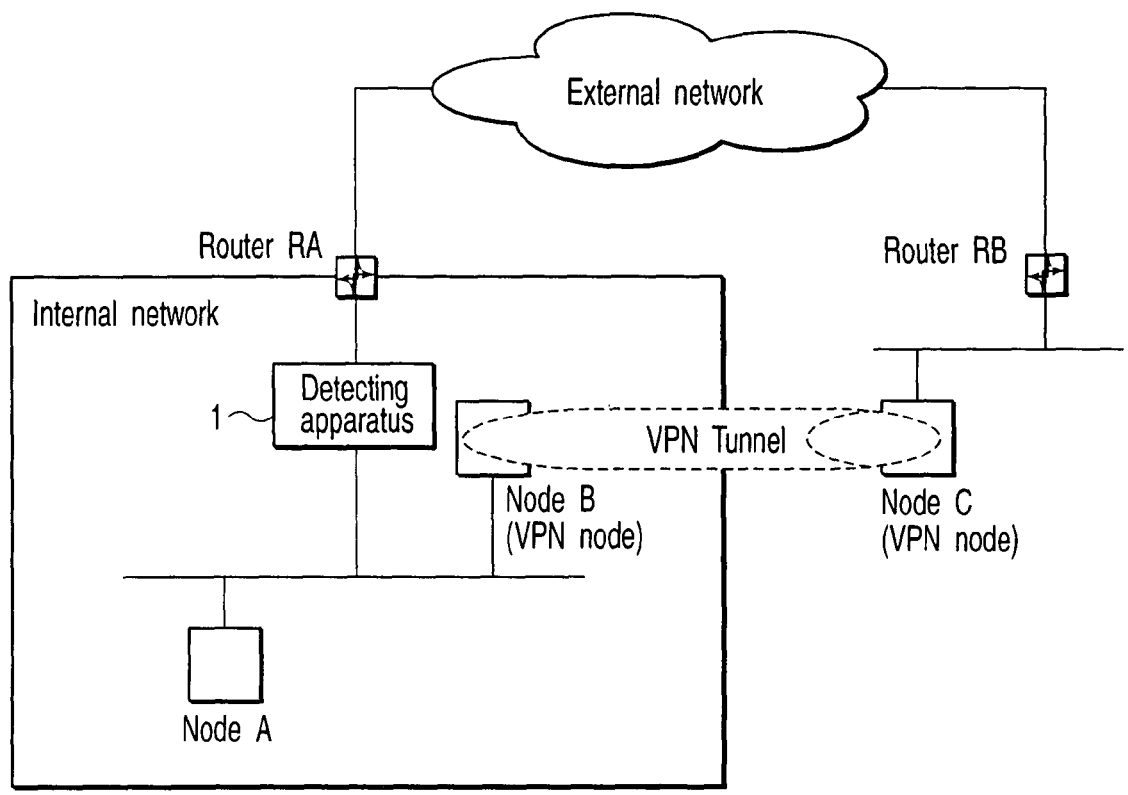
FIG. 7 is a block diagram showing an example of a network arrangement according to the first embodiment.

FIG. 7 shows an example of a network arrangement in which an internal network includes the detecting apparatus 1 in FIG. 6. In this case, the internal network is, for example, an IPv4 subnet with "133.196.16.0/24", and a communication apparatus corresponding to a node C connects to the internal network through L2VPN. This L2VPN uses TCP for the distribution of data.

Referring to FIG. 7, the detecting apparatus 1 detects that the node C connects through VPN, and a packet transferred by VPN communication through a route like that shown in FIG. 3.

2. First Detecting Method: When Detecting Apparatus Inserts Delivery Delay and Performs Detection In this method, the detecting apparatus 1 delays all packets which it forwards, and checks the correlation between each inserted delay and the time (response time) required for a response packet to return after a packet (detection packet) for requesting a response is transmitted to a test target node, thereby detecting whether the test target node is a node on an external network, and then connects to the internal network through a VPN tunnel.

The MAC address and IP address of a test target node (the node C in this case) are given to the detecting apparatus 1 (the determination unit 102 thereof).

Figure 11:
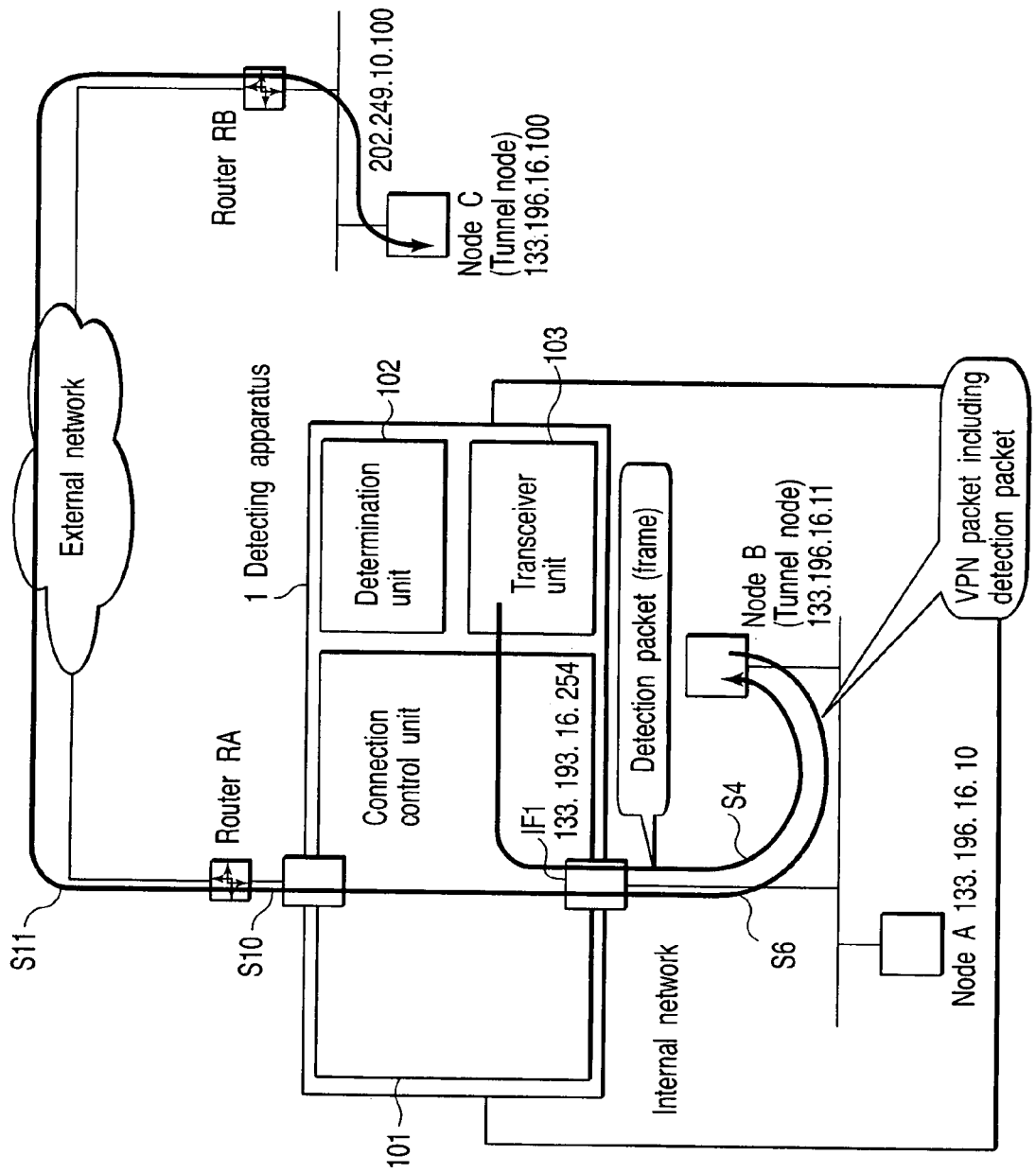
FIG. 11 is a view for explaining the flow of data in a network according to the first embodiment, which shows the flow of data up to the point where a detection packet reaches a node C in a case wherein a test target node is a node which is performing VPN communication with a node on the internal network.
Figure 12:
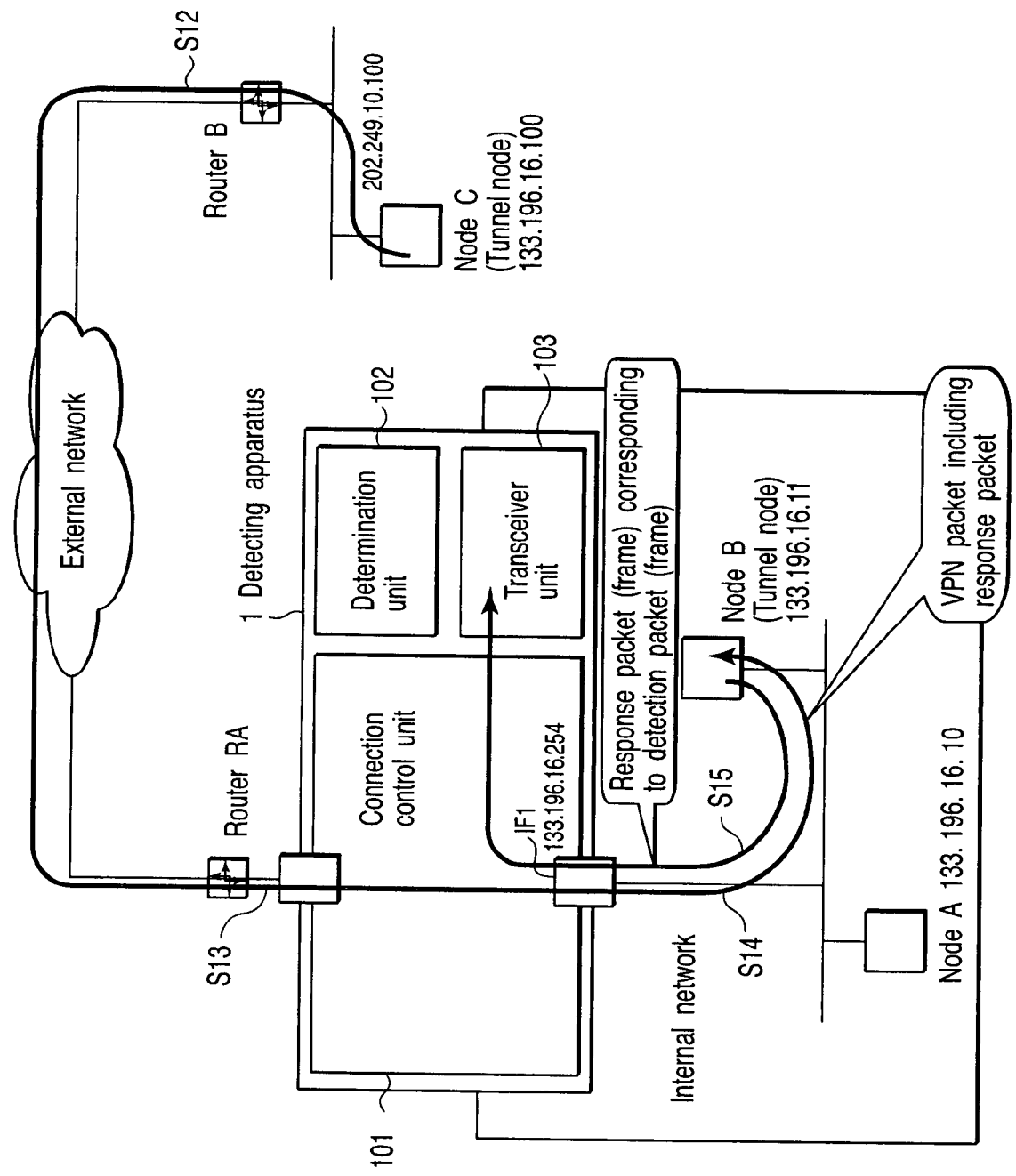
FIG. 12 is a view for explaining the flow of data in a network according to the first embodiment, which shows the flow of data up to the point where a response packet from the node C reaches the detecting apparatus in a case wherein a test target node is a node which is performing VPN communication with a node on the internal network.

The first detecting method will be described below with reference to the flowchart shown in FIG. 8, the sequence chart shown in FIG. 9, and the flows of data in the networks shown in FIGS. 11 and 12.

Figure 8:
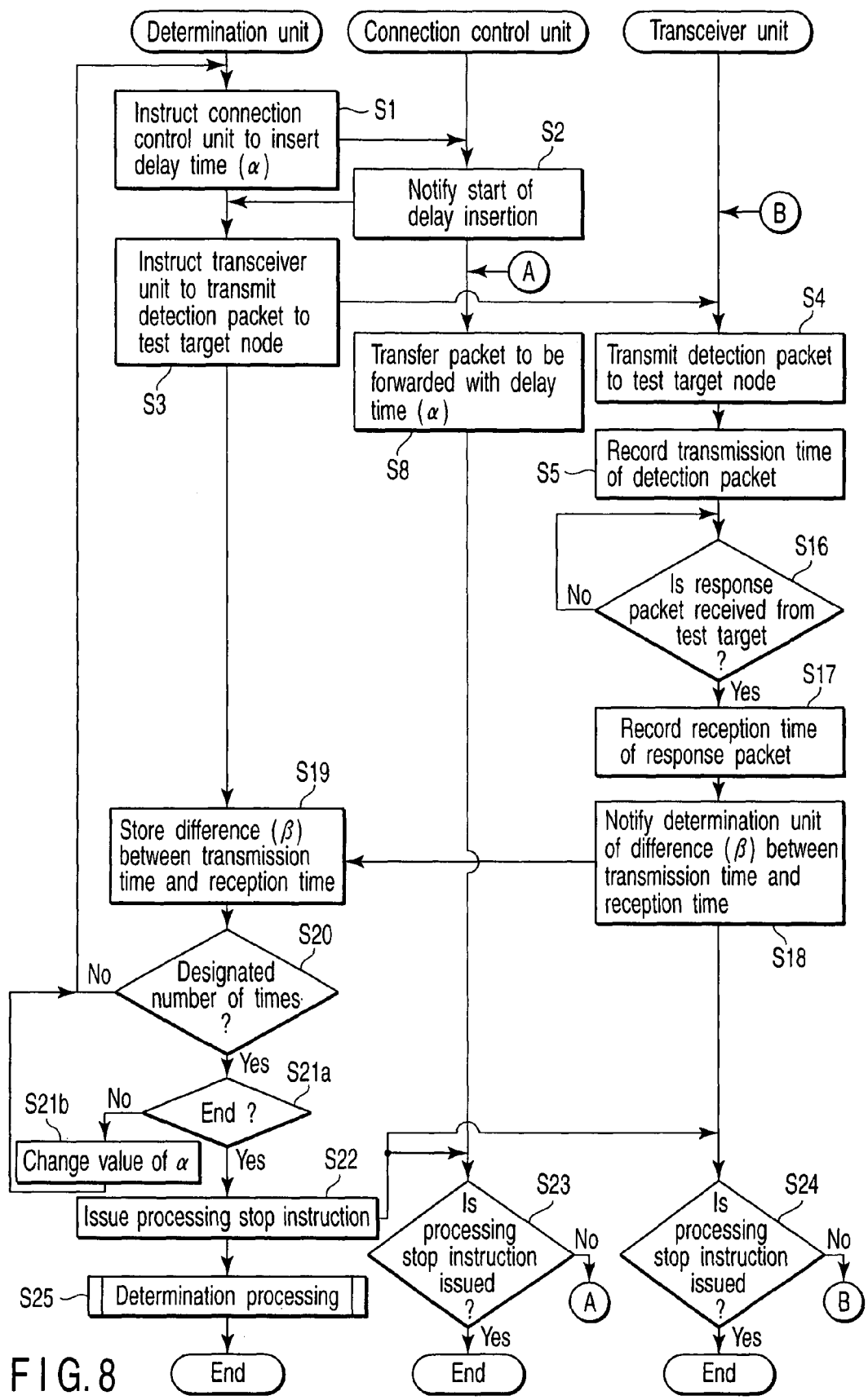
FIG. 8 is a flowchart for explaining the processing operation of the detecting apparatus to which the first detecting method of detecting VPN communication by delaying a packet passing through a relay apparatus is applied.

FIG. 8 is a flowchart for explaining the processing operation of the detecting apparatus 1. FIG. 9 shows a sequence chart showing the flow of data in the networks according to the first embodiment. FIGS. 11 and 12 are views for explaining the flows of data in the networks according to the first embodiment. FIG. 11 shows the flow of data up to the point where a detection packet reaches the node C in a case wherein a test target node is a node which is performing VPN communication with a node on the internal network. FIG. 12 is a view showing the flow of data up to the point where a response packet from the node C reaches the detecting apparatus.

Referring to FIG. 8, the determination unit 102 instructs the connection control unit 101 to delay time α (α is a variable value) for a packet passing through the detecting apparatus 1 (step S1).

The connection control unit 101 notifies the determination unit 102 of the start of delay insertion (step S2). Subsequently, the connection control unit 101 delays one or both of a packet input from the router RA side to the detecting apparatus 1 and a packet input from the internal network side to the detecting apparatus 1 by the delay time α, transfers the packet, input from the router RA side to the detecting apparatus 1, to the internal network side, and transfers the packet, input from the internal network side to the detecting apparatus 1, to the router RA side until the reception of a processing stop instruction from the determination unit 102 (step S22).

The determination unit 102 instructs the transceiver unit 103 to transmit a detection packet to a test target node (e.g., the node C), together with the MAC address and IP address (e.g., the internal network IP address of the node C) (step S3).

Upon receiving this instruction, the transceiver unit 103 transmits a detection packet to the test target node (step S4). A detection packet uses a packet designed to receive a response to a request (based on, for example, ICMPecho (ICMP echo request), ARP, or ICMPv6ND (Neighbor Discovery)).

Figure 13:
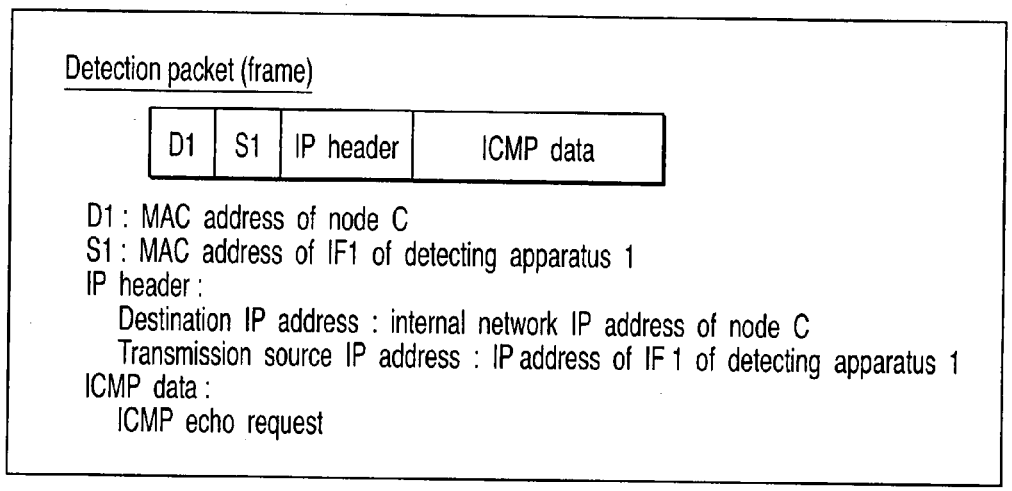
FIG. 13 is a view showing an example of a detection packet.

FIG. 13 shows an example of a detection packet (frame), which exemplifies a detection packet containing an ICMP echo request.

The transceiver unit 103 includes a measurement means for measuring the time required to receive a response packet after the transmission of the detection packet to the test target node, i.e., a response time. Upon transmitting the detection packet to the test target node, in order to measure this response time, the transceiver unit 103 stores the transmission time of the detection packet (step S5).

Figure 9:
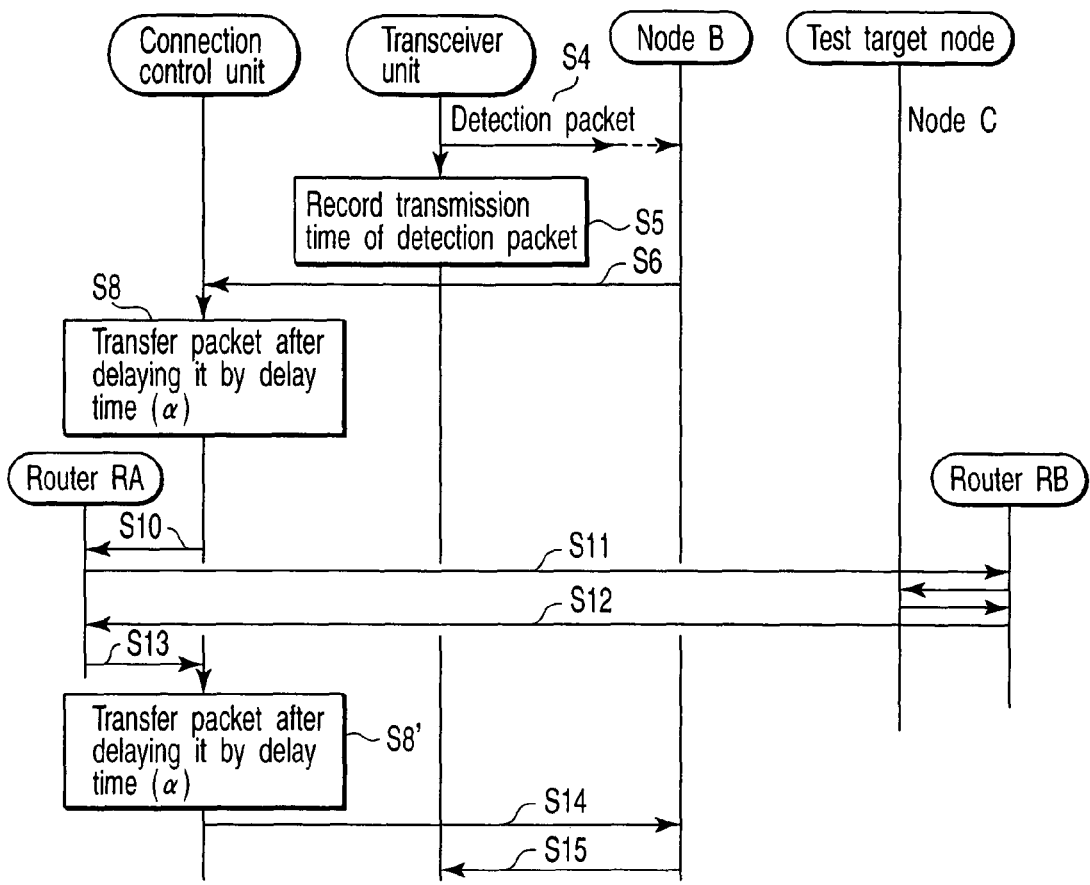
FIG. 9 is a sequence chart for explaining the flow of data in a network according to the first detecting method, which shows a case wherein a test target node is a node which is performing VPN communication with a node on the internal network.
Figure 14:
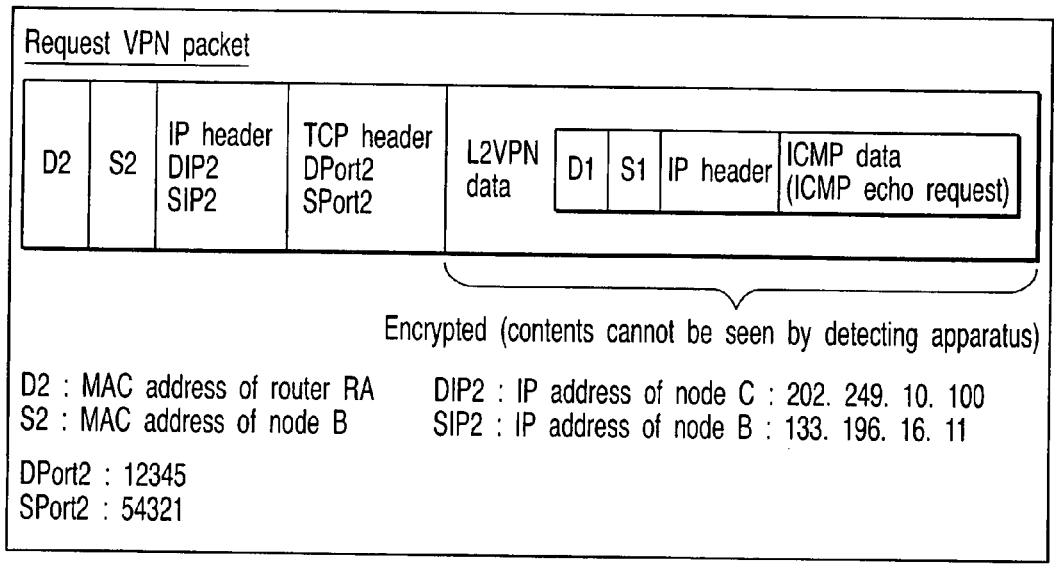
FIG. 14 is a view showing an example of a request VPN packet containing a detection packet transmitted from a node B.

In step S6 in FIG. 9, upon receiving the detection packet, a node B encapsulates the detection packet to generate a VPN packet (request VPN packet) containing encrypted L2VPN data containing the detection packet like that shown in FIG. 14. The node B transmits this request VPN packet to the router RA.

When the request VPN packet passes through the detecting apparatus 1, the connection control unit 101 delays the packet by the delay time α, and transfers it to the router RA side (step S8).

The router RA receives the request VPN packet passing through the connection control unit 101, as shown in FIG. 9 (step S10).

The router RA removes a MAC header (destination and transmission source MAC addresses D2 and S2 in FIG. 14) from the received request VPN packet, and transmits the IP packet contained in the request VPN packet to the external network (step S11). In this case, the destination IP address of the IP packet is the IP address "202.249.10.100" of the node C, and the transmission source IP address is the IP address of the node B. The node C receives the IP packet through a router RB (with a MAC header being added to the IP packet).

The node C transmits a response VPN packet addressed to the router RA, which is obtained by encapsulating L2VPN data containing an ICMP echo response addressed to "IF1" of the detecting apparatus 1. The router RB removes the MAC header of the response VPN packet, and transmits, to the external network, the IP packet addressed to the node B (the destination IP address is the IP address of the node B) contained in the response VPN packet (step S12).

The router RA receives the IP packet addressed to the node B. The router RA transmits, to the internal network, a response VPN packet like that shown in FIG. 15 upon adding a MAC header to the IP packet with the MAC header containing the MAC address of the node B as a destination and the MAC address of the router RA as a transmission source (step S13). The response VPN packet like that shown in FIG. 15 is transmitted to the detecting apparatus 1.

The connection control unit 101 of the detecting apparatus 1 transfers a packet transmitted from the router RA to the internal network side upon delaying it by the delay time α (step S8').

Referring to FIG. 9, when a packet propagating from the internal network to the external network and a packet propagating from the external network to the internal network pass through the detecting apparatus 1, the packets delayed for the delay time α in steps S8 and S8'. However, the either of them may be delayed for the delay time α. For example, it suffices to delay, for the delay time α, a packet propagating from the internal network to the external network in step S8 and transfer a packet transmitted from the router RA to the internal network side without delaying (skipping step S8'). Alternatively, it suffices to transfer a packet from the internal network to the external network without delaying (skipping step S8) and transfer a packet transmitted from the router RA to the internal network upon delaying for the delay time α in step S8'.

When the delay time α is inserted for both a packet propagating from the internal network to the external network and a packet propagating from the external network to the internal network, which pass through the detecting apparatus 1, the total delay time becomes 2α. When the delay time α is inserted in either of them, the total delay time becomes α. In the former case, the determination processing to be described later is performed to check the correlation between the inserted delay time 2α and a measured response time β.

In this case, for the sake of simplicity, the following description will exemplify a case wherein the delay time α is inserted for either a packet propagating from the internal network to the external network or a packet propagating from the external network to the internal network, which passes through the detecting apparatus 1 (the delay time α is inserted in either step S8 or step S8'), i.e., a case wherein the total delay time inserted by the detecting apparatus 1 is α.

The VPN packet shown in FIG. 15 is transferred to the internal network through the detecting apparatus 1 and received by the node B (step S14).

The node B extracts a response packet (see FIG. 16) corresponding to the above detection packet, which contains the MAC address of the IF1 of the detecting apparatus 1 as a destination and the MAC address of the node C as a transmission source, from the L2VPN data contained in the received VPN packet shown in FIG. 15, and transmits the response packet to the internal network (step S15).

In step S16 in FIG. 8, the transceiver unit 103 receives this response packet through the IF1 of the detecting apparatus 1. The transceiver unit 103 determines from the MAC header (D3 and S3 in FIG. 16) of this response packet and the IP header whether the response packet is a response packet from the test target node (the node C in this case). If the transmission source matches the MAC address of the node C and the internal network IP address of the node C, it is determined that the response packet is a response packet from the test target node, and the process advances to step S17.

In step S17, if the response packet is a packet from the node C, the transceiver unit 103 stores the reception time of the response packet.

The transceiver unit 103 then notifies the determination unit 102 of the difference between the time of transmission (transmission time) of the detection packet to the test target node C and the time of the reception (reception time) of the response packet in response to the detection packet, i.e., the response time β (step S18).

The determination unit 102 stores the response time β, notified from the transceiver unit 103, in correspondence with the delay time α (step S19).

The processing from step S1 to step S19 is repeated a pre-designated number of times (step S20).

After the processing from step S1 to step S19 is repeated a pre-designated number of times, the process advances to step S21b to change the value of the delay time α and repeat the processing from step S1 to step S19 the pre-designated number of times. Upon performing the processing from step S1 to step S19 with respect to a plurality of different (a predetermined number of) delay times α, in which the delay times are inserted and the values of β are measured (step S21a), the determination unit 102 advances to step S22.

In step S22, the determination unit 102 instructs the connection control unit 101 to stop the insertion of the delay α for a packet passing through the detecting apparatus 1, and instructs the transceiver unit 103 to stop the processing.

Upon receiving the above stop instruction, the connection control unit 101 stops the delay inserting operation shown in FIG. 8 (step S23).

Upon receiving the stop instruction, the transceiver unit 103 stops the processing shown in FIG. 8 (step S24).

The determination unit 102 determines, on the basis of a plurality of measurement results (delay times α and response times β) notified from the transceiver unit 103, whether the test target node C connects to the internal network through a VPN tunnel (step S25).

For example, as shown in FIG. 17, assume that when the delay time α is "0.00" sec, the average value of β measured the designated number of times is "0.01" sec, when the delay time α is "0.20" sec, the average value of β measured the designated number of times is "0.21" sec, and when the delay time α is "0.25" sec, the average value of β measured the designated number of times is "0.26" sec.

In this case, as the delay time α increases, the value of β increases; the value of β is influenced by a change in delay time α. That is, the correlation between α and β is high. This indicates that since the delay time α is inserted in the response time β between the time point at which the detecting apparatus 1 transmits a detection packet and the time point at which a corresponding response packet is received, a packet delayed for the delay time α is a packet transferred from the internal network to the external network or a packet transferred from the external network to the internal network. That is, it is detected that the test target node C connects to the internal network through the VPN tunnel.

Figure 10:
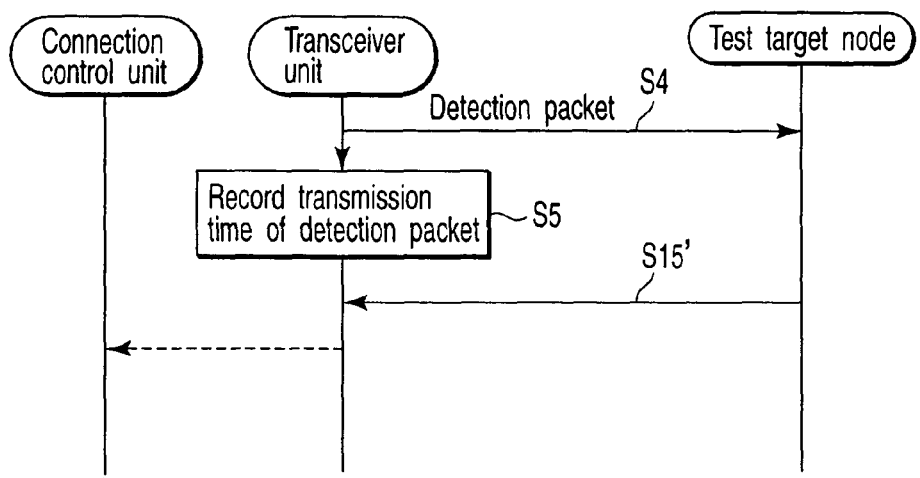
FIG. 10 is a sequence chart for explaining the flow of data in a network according to the first detecting method, which shows a case wherein a test target node is a node on the internal network.

If the test target node C exists in the internal network, the detection packet transmitted by the transceiver unit 103 is directly received by the test target node C, and a corresponding response packet is transmitted to the IF1 of the detecting apparatus in step S4, as shown in FIG. 10. During this operation, the delay time α is not inserted. That is, since no detection packet passes through the detecting apparatus 1 and the router RA, even if the delay time α inserted for a packet passing through the detecting apparatus 1 changes or no delay time is inserted, the time taken to receive a response packet from the test target node after the transmission of a detection packet does not change and is almost constant. Alternatively, if this time varies due to some factor and exhibits an inverse function (for example, when α=0, β=0.1, and when α=0.2, β=0.01), i.e., the node C exists within the internal network, the correlation between the delay time α and β is low.

3. Second Detecting Method: When Detecting Apparatus Discards Packet and Performs Detection In this method, the detecting apparatus 1 discards all forwarded packets, and compares the reachability of packets to a test target node when packets are discarded with that when packets are not discarded to detect whether the test target node is a node on the external network and connects to the internal network through the VPN tunnel.

The following description will exemplify a case wherein when packets propagating from the external network to the internal network, of packets propagating from the internal network to the external network and packets propagating from the external network to the internal network, are input to the detecting apparatus 1 through the router RA, the detecting apparatus 1 discards all the packets.

The detecting apparatus 1 (the determination unit 102 thereof) is provided in advance with the MAC address and IP address of a test target node (the node C in this case).

The second detecting method will be described below with reference to FIG. 18.

Figure 18:
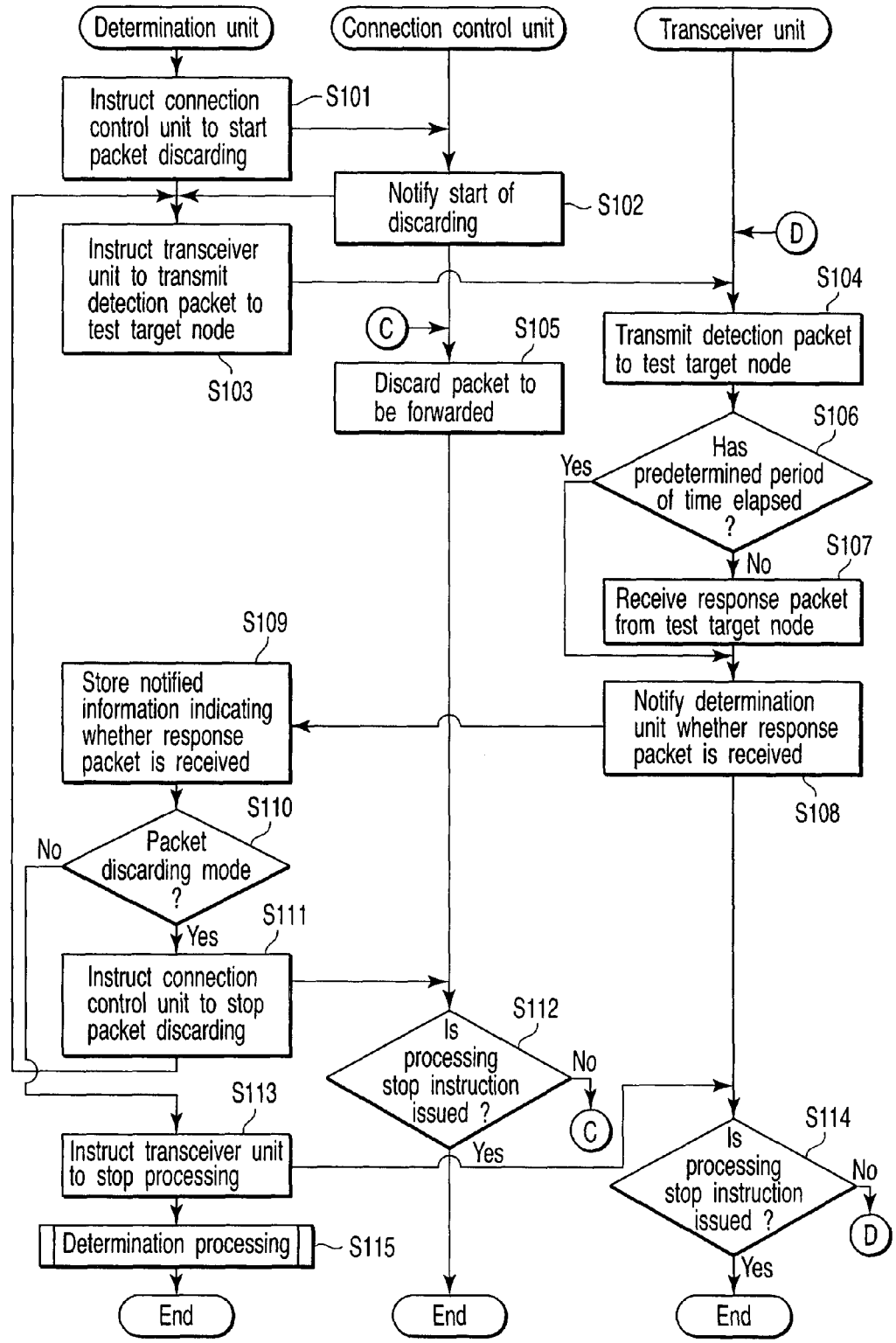
FIG. 18 is a flowchart for explaining the processing operation of a detecting apparatus to which the second detecting method of detecting VPN communication by discarding a packet passing through a relay apparatus is applied.

Referring to FIG. 18, the determination unit 102 instructs the connection control unit 101 to start discarding packets passing through the detecting apparatus 1 (step S101).

The connection control unit 101 has a packet discarding mode of discarding either or both of a packet input from the external network and addressed to a node on the internal network and a packet input from the internal network and addressed to a node on the external network and a normal mode of not discarding any packet. Upon receiving the above packet discarding start instruction, the connection control unit 101 switches the normal mode to the packet discarding mode. The connection control unit 101 then notifies the determination unit 102 of the start of discarding a packet (step S102). Subsequently, the connection control unit 101 keeps discarding packets passing through the router RA until the reception of a processing stop instruction from the determination unit 102 in step S111.

The determination unit 102 instructs the transceiver unit 103 to transmit a detection packet to the test target node, together with the MAC address of the test target node (e.g., the node C) and an IP address (the internal network IP address of the node C) (step S103).

Upon receiving this instruction, the transceiver unit 103 transmits a detection packet to the test target node (step S104). As a detection packet, a packet designed to receive a response to a request (based on, for example, ICMPecho (ICMP echo request), ARP, or ICMPv6ND) is used. For example, a detection packet like that shown in FIG. 13 is transmitted.

If the test target node is located at the end point of the VPN tunnel, the node B receives a detection packet first as described in the first detecting method. The node B encapsulates the detection packet to generate a VPN packet (request VPN packet) containing encrypted L2VPN data containing the detection packet, like that shown in FIG. 14. The node B transmits this request VPN packet to the router RA.

In this case, the request VPN packet passes through the detecting apparatus 1 and is directly input to the router RA.

The router RA removes the MAC header (D2 and S2 in FIG. 14) from the request VPN packet shown in FIG. 14, and transmits the IP packet contained in the request VPN packet to the external network. In this case, the destination IP address of the IP packet coincides with the IP address (202.249.10.100) of the node C, and the transmission source IP address coincides with the IP address of the node B. The node C receives the IP packet through the router RB (with, for example, a MAC header being added to the IP packet).

The node C transmits a response VPN packet obtained by encapsulating L2VPN data containing a response packet, like that shown in FIG. 16, which is addressed to the "IF1" of a detecting apparatus 2 and contains an ICMP echo response to the ICMP echo request contained in the received packet. The router RB removes the MAC header of this response VPN packet, and transmits, to the external network, an IP packet addressed to the node B (with the destination IP address coinciding with the IP address of the node B) contained in the response VPN packet.

The router RA receives the IP packet addressed to the node B. The router RA transmits, to the detecting apparatus 1, a response VPN packet like that shown in FIG. 15, which is obtained by adding a MAC header having the MAC address of the node B as a destination and the MAC address of the router RA as a transmission source to the IP packet.

The connection control unit 101 of the detecting apparatus 1 discards the above response VPN packet input from the router RA side (step S105). Consequently, since the response VPN packet does not reach the node B, the transceiver unit 103 does not receive any response packet like that shown in FIG. 16 from the node C during a predetermined period of time (step S106) after transmitting the detection packet to the node C (step S107).

Note that the transceiver unit 103 comprises a measurement means for measuring the above predetermined period of time after transmitting the response packet.

If the node C is a node on the internal network, even if the connection control unit 101 of the detecting apparatus 1 discards a packet, since the detection packet transmitted from the transceiver unit 103 does not pass through the detecting apparatus 1, the packet reaches the node C. Upon receiving the detection packet, the node C transmits a response packet like that shown in FIG. 16. As a result, the transceiver unit 103 receive the above response packet like that shown in FIG. 16 from the node C during a predetermined period of time (step S106) after transmitting the detection packet addressed to the node C (step S107).

When the transceiver unit 103 receives the above response packet from the node C during the above predetermined period of time after the predetermined period of time, the process advances to step S108.

In step S108, the transceiver unit 103 notifies the determination unit 102 of information indicating whether it has received a response packet from the node C.

Upon receiving this notification, the determination unit 102 stores information indicating whether the notified response packet is received or not (step S109).

With the processing from step S101 to step S109 described above, when the connection control unit 101 is to discard a packet, it checks whether to receive a response packet from the node C within a predetermined period of time after the transmission of a detection packet, and the process then advances from step S110 to step S111. When the connection control unit 101 is not to discard any packet, it checks whether to receive a response packet from the node C. For this purpose, first of all, an instruction to stop packet discarding is issued to the connection control unit 101 in step S111. Upon receiving this instruction, the connection control unit 101 stops packet discarding, and switches to the normal mode. Thereafter, the determination unit 102 returns to step S103 to instruct the transceiver unit 103 again to transmit a detection packet addressed to the test target node C.

Upon receiving this instruction, the transceiver unit 103 transmits a detection packet to the test target node (step S104). In this case, the request VPN packet transmitted from the node B and addressed to the router RA passes through the router RA and reaches the node C through the router RB. A response VPN packet like that shown in FIG. 15, which contains the response packet transmitted from the node C and shown in FIG. 16, i.e., a packet containing the IP address of the node B as a destination IP address and the IP address (202.249.10.100) of the node C as a transmission source IP address, passes through the router RA and is input to the detecting apparatus 1. However, this packet is transferred to the internal network without being discarded by the connection control unit 101.

The above response packet shown in FIG. 16 is therefore transmitted to the detecting apparatus 2 through the node B. As a result, the transceiver unit 103 receives the above response packet like that shown in FIG. 16 (step S107), which is transmitted from the node C, during a predetermined period of time after the transmission of the detection packet addressed to the node C (step S106).

When the transceiver unit 103 receives the above response packet from the node C after the lapse of the above predetermined period of time or during the predetermined period of time, the process advances to step S108.

In step S108, the transceiver unit 103 notifies the determination unit 102 of information indicating whether it has received a response packet from the node C.

Upon receiving this notification, the determination unit 102 stores information indicating whether the notified response packet is received or not (step S109). The process then advances to step S113 to issue a processing stop instruction to the transceiver unit 103.

Upon receiving the above stop instruction, the transceiver unit 103 stops the processing shown in FIG. 18 (step S114).

The determination unit 102 determines, on the basis of the information notified from the transceiver unit 103, which indicates whether a response packet is received or not when packet discarding is performed and not performed, whether the test target node C connects to the internal network through the VPN tunnel (step S115).

In step S115, when the connection control unit 101 does not perform packet discarding, the determination unit 102 receives the response packet from the node C. However, when the connection control unit 101 performs packet discarding and the determination unit 102 does not receive the response packet from the node C, it is detected that the test target node C connects to the internal network through the VPN tunnel. In either of the cases wherein the connection control unit 101 does not perform packet discarding and performs packet discarding, when a response packet is received from the node C, it is detected that the test target node C exists in the internal network and is not a node which connects to the internal network through the VPN tunnel.

The above description has exemplified the case wherein when packets propagating from the external network to the internal network, of packets propagating from the internal network to the external network and packets propagating from the external network to the internal network, are input to the detecting apparatus 1 through the router RA, the detecting apparatus 1 discards all the packets. However, the present invention is not limited to this. For example, when a packet propagating from the internal network to the external network, of a packet propagating from the internal network to the external network and a packet propagating from the external network to the internal network, passes through the detecting apparatus 1, the detecting apparatus 1 may discard the packet. Alternatively, when packets propagating from the internal network to the external network and packets propagating from the external network to the internal network pass through the detecting apparatus 1, the detecting apparatus 1 may discard all the packets. In either case, effects similar to those described above can be obtained in accordance with the procedure shown in FIG. 18.

4. Third Detecting Method: When Detecting Apparatus Inserts Delivery Delay for Each Connection and Performs Detection This method is designed to insert a delay time each packet forwarded by detecting apparatus 1 for each type of packet (e.g., a packet selected as a test target packet) and check the correlation between the inserted delay and the time (response time) required to receive a response packet after the transmission of a packet (detection packet) which requires a response to a test target node, thereby detecting whether the test target node is a node on the external network and connects to the internal network through the VPN tunnel. This detection allows to determine that the packet which is delayed is a VPN packet exchanged with the test target node.

In this case, a packet identified by attribute information such as a MAC address, an IP address, a communication protocol such as IPv4, IPv6, TCP, or UDP, and a port number such as TCP or UDP is called a "connection". For example, a packet having attribute information including a transmission source IP address "A", destination IP address "B", transmission source TCP port number "C", and destination TCP port number "D" will be called a connection.

A connection monitoring processing operation for obtaining attribute information for identifying each packet passing through the router RA, which is performed as preprocessing for detection processing which is performed to detect a node connecting through VPN and a packet for VPN communication, will be described first.

(1) Connection Monitoring Processing

A connection monitoring operation will be described below with reference to the sequence chart shown in FIG. 19. In this case, the detecting apparatus 1 has in advance the MAC address and IP address of a test target node (the node C in this case).

First of all, the determination unit 102 instructs the connection control unit 101 to start connection monitoring operation (step S201).

Upon receiving the instruction to start connection monitoring operation, the connection control unit 101 starts connection monitoring operation and notifies the determination unit 102 of the corresponding information (step S202).

The determination unit 102 instructs the transceiver unit 103 to transmit a detection packet addressed to a test target node (step S203).

The transceiver unit 103 transmits a detection packet to the test target node (step S204). A detection packet uses a packet designed to receive a response to a request (based on, for example, ICMPecho, ARP, or ICMPv6ND). For example, a detection packet like that shown in FIG. 13 is transmitted.

If the test target node is located at the end point of the VPN tunnel, the node B receives the detection packet first. The node B encapsulates the detection packet to generate a VPN packet (request VPN packet) containing encrypted L2VPN data containing the detection packet like that shown in FIG. 14. The node B transmits this request VPN packet to the router RA (step S205).

The above request VPN packet reaches the detecting apparatus 1 first. The VPN packet which has reached the detecting apparatus 1 passes through the connection control unit 101. The connection control unit 101 extracts information (packet attribute information) associated with the packet, adds the VPN packet and packet identification information for identifying the packet to the information, and stores the resultant information in a prepared table (connection control table) (step S206).

The packet attribute information contains the destination MAC address (D2 in FIG. 14) of the VPN packet, a transmission source MAC address (S2 in FIG. 14), a destination IP address (the IP address "202.249.10.100" of the node C in FIG. 14 (DIP2)) contained in an IP header, a transmission source IP address (the IP address SIP2 of the node B in FIG. 14), a protocol number contained in the link layer header or IP header of the VPN packet, a destination port number (DPort2 in FIG. 14), a transmission source port number (SPort2 in FIG. 14), and the like.

For example, "ID3" is added as packet identification information to the VPN packet shown in FIG. 14, and the packet attribute information obtained from the VPN packet and the packet identification information "ID3" are stored in the connection control table in correspondence with each other, as shown in FIG. 20.

The router RA receives the VPN packet passing through the connection control unit 101. The router RA removes a MAC header (the destination and transmission source MAC addresses D2 and S2 in FIG. 14), and transmits the IP packet contained in the VPN packet to the external network (step S207). In this case, the destination IP address of the IP packet coincides with the IP address "202.249.10.100" of the node C, and the transmission IP address coincides with the IP address of the node B. The node C receives this IP packet through the router RB.

The node C encapsulates L2VPN data containing an ICMP echo addressed to the detecting apparatus 1, and transmits the VPN packet addressed to the router RA. The router RB removes the MAC header of the VPN packet, and transmits the IP packet contained in the VPN packet and addressed to the node B to the external network (step S208).

The router RA receives the IP packet. The router RA transmits a VPN packet like that shown in FIG. 15 to the internal network, which is obtained by adding a MAC header having the MAC address of the node B as a destination and the MAC address of the router RA as a transmission source to the IP packet (step S209). The detecting apparatus 1 transmits the VPN packet like that shown in FIG. 15.

The VPN packet like that shown in FIG. 15 which has reached the detecting apparatus 1 passes through the connection control unit 101. In this case, as in step S206, the connection control unit 101 extracts information (packet attribute information) associated with the packet, and stores it in a prepared table (connection control table), with the VPN packet and packet identification information for identifying the packet being added to the information (step S210).

For example, "ID4" is added as packet identification information to the VPN packet shown in FIG. 15, and the packet attribute information obtained from the VPN packet and the packet identification information "ID4" is stored in the connection control table in correspondence with each other, as shown in FIG. 20.

The VPN packet shown in FIG. 15 passes through the connection control unit 101 and is received by the node B (step S211).

The node B extracts a response packet (see FIG. 16) corresponding to the detection packet, which contains the MAC address of the IF1 of the detecting apparatus 1 as a destination and the MAC address of the node C as a transmission source, from the L2VPN data contained in the received VPN packet shown in FIG. 15, and transmits this response packet to the internal network (step S212). The transceiver unit 103 receives this response packet through the IF1 of the detecting apparatus 1.

In the above manner, the detecting apparatus 1 can acquire the attribute information of each packet passing through the router RA.

The above operation has exemplified the sequence of operation concerning one detection packet addressed to a given node. The transceiver unit 103 performs the above operation by transmitting a plurality of detection packets addressed to a plurality of nodes within a predetermined period of time.

The connection control unit 101 stores the attribute information and identification information of each packet passing through the router RA within this predetermined period of time.

The determination unit 102 measures the above period of time. When this predetermined period of time has elapsed, the determination unit 102 outputs a request to stop the transmission of a detection packet to the transceiver unit 103 (step S213). The connection control unit 101 outputs a connection monitoring stop instruction (step S214).

Upon receiving this connection monitoring stop instruction, the connection control unit 101 notifies the determination unit 102 of the information stored in the connection control table (step S215).

Upon receiving this notification, the determination unit 102 stores it in a connection control table like that shown in FIG. 20.

At this stage, the detecting apparatus 1 only has recognized the attribute information of each packet passing through the router RA, but has not detected that, for example, the packet with the packet identification information "ID3" is a packet for VPN communication and the node C is connecting through VPN.

Figure 19:
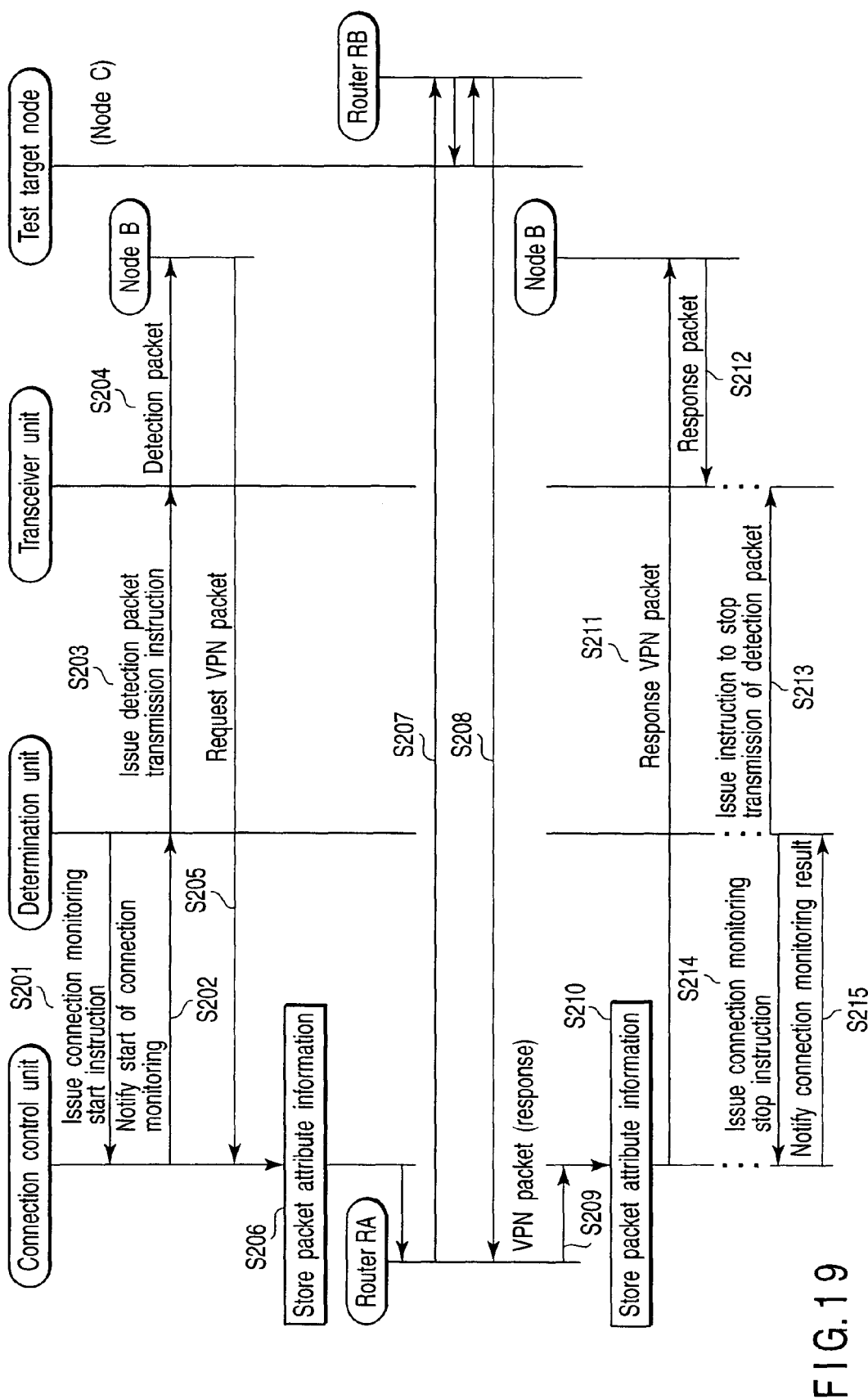
FIG. 19 is a sequence chart for explaining connection monitoring processing for acquiring the packet attribute information of a packet passing through the relay apparatus.

Referring to FIG. 19, a detection packet is transmitted to a test target node (the node C in this case). However, a detection packet need not always be transmitted. That is, upon receiving the connection monitoring start instruction from the determination unit 102, the connection control unit 101 may acquire the above packet attribute information of each packet (a packet propagating from the external network to the internal network and a packet propagating from the internal network to the external network) which passes through the detecting apparatus 1 within the above predetermined period of time.

(2) Detection Processing

A detecting method of detecting a node connecting through VPN and a packet for VPN communication by using the connection control table shown in FIG. 20 in the detecting apparatus 1 will be described next.

The detecting method will be described below with reference to the flowchart shown in FIG. 21, the sequence chart shown in FIG. 22, and the flows of data in the networks shown in FIGS. 11 and 12.

Figure 21:
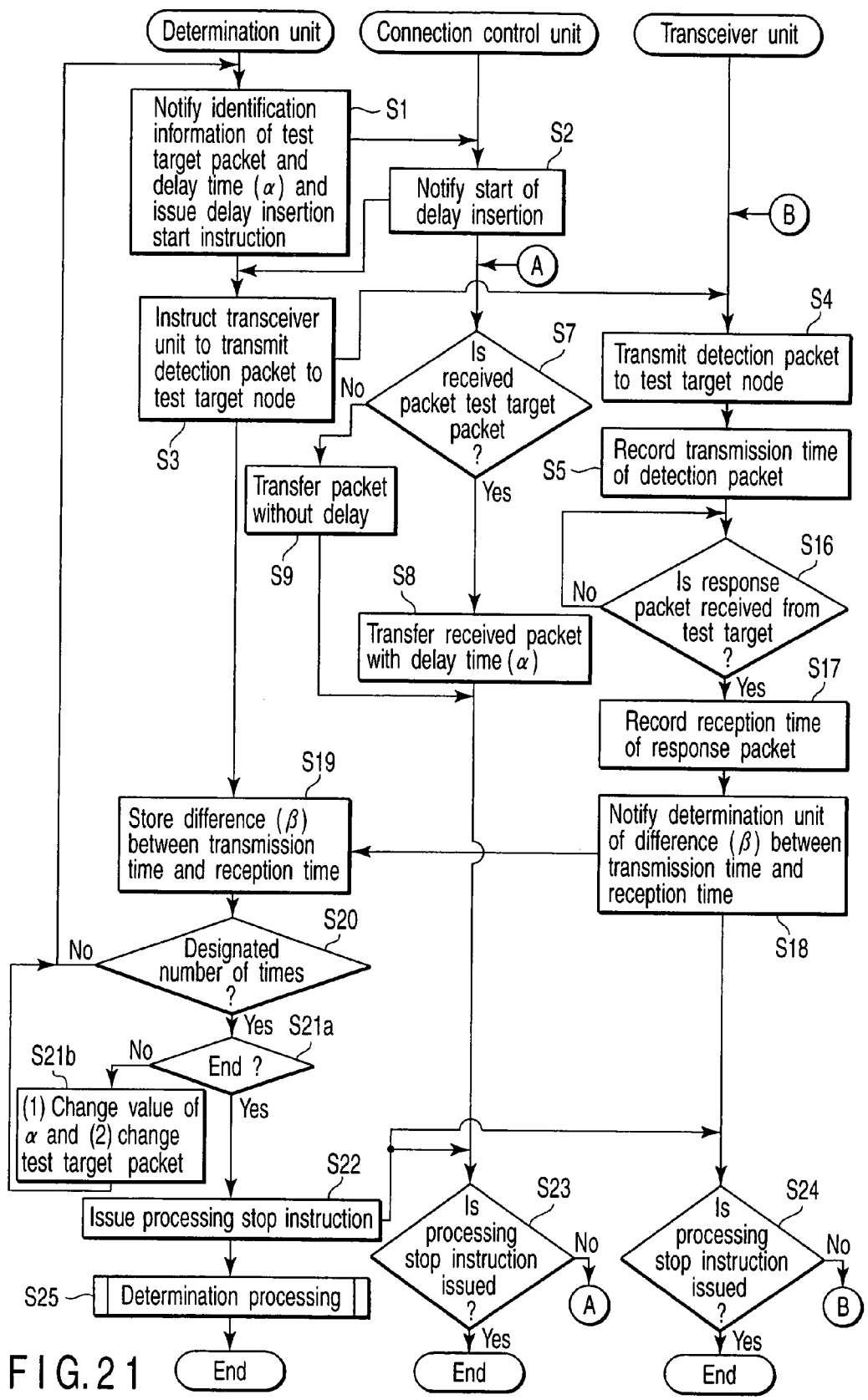
FIG. 21 is a flowchart for explaining the processing operation of a relay apparatus to which the third detecting method of detecting VPN communication by delaying a test target packet selected in advance from packets passing through a relay apparatus is applied.
Figure 22:
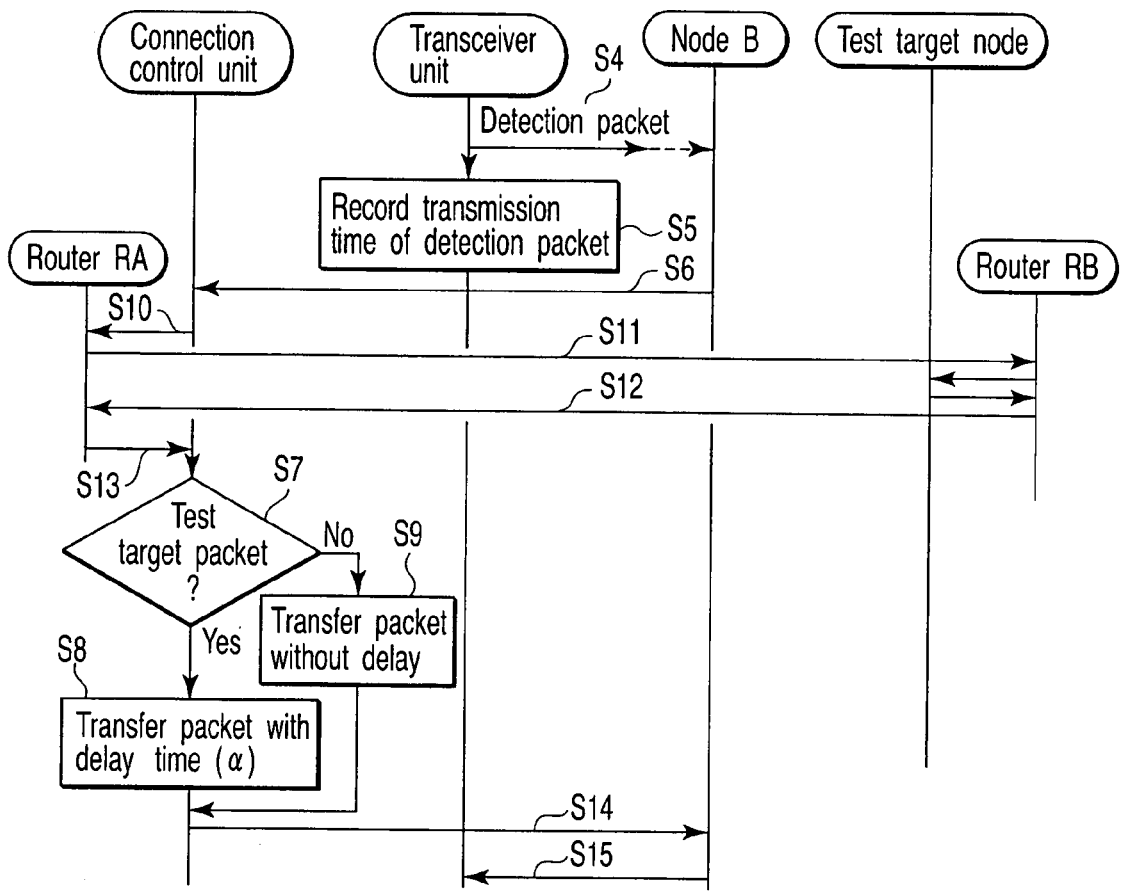
FIG. 22 is a sequence chart for explaining the flow of data in a network according to the third detecting method, which shows a case wherein a test target node is a node which is performing VPN communication with a node on the internal network.

Note that the same reference numerals as in FIG. 21 denote the same steps in FIG. 8, and the same reference numerals as in FIG. 22 denote the same steps in FIG. 9.

First of all, the detecting apparatus 1 has in advance the MAC address and IP address of a test target node (the node C in this case). In addition, the user designates the packet identification information or a packet which is to be a test target or packet attribute information among the packet identification information stored in the connection control table shown in FIG. 20. For example, assume that the user has designated pieces of information with the protocol number "6" contained in packet attribute information, i.e., pieces of packet identification information "ID1" to "ID4", among the packet identification information in the connection control table shown in FIG. 20.

Referring to FIG. 21, the determination unit 102 then selects one piece of packet identification information of the designated pieces of packet identification information "ID1" to "ID", and sets the packet with the selected packet identification information as a test target node. The determination unit 102 notifies the connection control unit 101 of the packet identification information of this test target node (or the packet identification information and packet attribute information made to correspond to the packet identification information) and the delay time $\alpha$ ($\alpha$ is a variable value), and instructs the connection control unit 101 to start delay insertion (step S1).

The following description will exemplify a case wherein the packet with the packet identification information "ID4" is selected, and the packet with the packet identification information "ID4" is set as a test target packet.

Note that the packet with the packet identification information "ID4" has the IP address of the IF1 of the detecting apparatus 1 as a destination IP address and the internal network IP address of the node C as a transmission source IP address.

Although a packet propagating from the internal network to the external network and a packet propagating from the external network to the internal network pass through the detecting apparatus 1, the following description will exemplify a case wherein a packet propagating from the internal network to the external network is transferred to the external network without insertion of the delay time $\alpha$, and a packet transmitted from the router RA is transferred to the internal network after the delay time $\alpha$ is inserted in it. In this case, the total delay time inserted (by the detecting apparatus 1) during the response time from the instant at which a request packet is transmitted to the instant at which a corresponding response packet is received is $\alpha$, and the correlation between $\alpha$ and $\beta$ is checked.

The present invention is not, however, limited to this case. As in the first detecting method described above, the delay time $\alpha$ may be inserted for a packet propagating from the internal network to the external network, and a packet transmitted from the router RA may be directly transferred to the internal network side without insertion of the delay time $\alpha$. In this case as well, the total delay time inserted during the response time (by the detecting apparatus 1) from the instant at which a request packet is transmitted to the instant at which a response packet is received is $\alpha$, and the correlation between $\alpha$ and $\beta$ is checked. In addition, when both a packet propagating from the internal network to the external network and a packet propagating from the external network to the internal network pass through the detecting apparatus 1, the delay time $\alpha$ may be inserted for both the packets. In this case, the total delay time inserted during the response time (by the detecting apparatus 1) from the instant at which a request packet is transmitted to the instant at which a response packet is received is $2\alpha$, and the correlation between $2\alpha$ and $\beta$ is checked.

The connection control unit 101 notifies the determination unit 102 of the start of delay insertion (step S2).

The determination unit 102 instructs the transceiver unit 103 to transmit a detection packet to a test target node (the node C in this case), together with the MAC address of the test target node and an IP address (e.g., the internal network IP of the node C) (step S3).

Upon receiving this instruction, the transceiver unit 103 transmits a detection packet to the test target node (step S4).

A detection packet uses a packet designed to receive a response to a request (based on, for example, ICMPecho (ICMP echo request), ARP, or ICMPv6ND).

Figure 23:
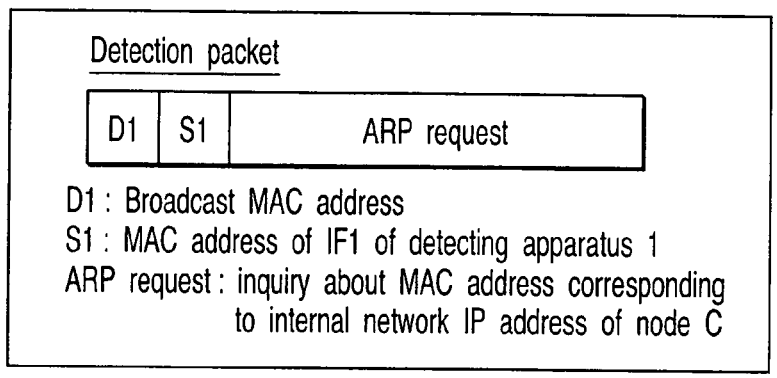
FIG. 23 is a view showing another example of a detection packet.

FIG. 23 shows an example of a detection packet (frame). This packet exemplifies a detection packet containing an ARP request for inquiring about a MAC address corresponding to the internal network IP address of the node C. A destination address D1 of this detection packet is a broadcast MAC address in the internal network, and a transmission source address S1 is the MAC address of the IF1 of the detecting apparatus 1.

When transmitting the detection packet to the test target node, the transceiver unit 103 stores the transmission time of the detection packet (step S5).

If the test target node is located at the end point of the VPN tunnel, the node B receives the detection packet first as described in FIG. 22.

Figure 24:
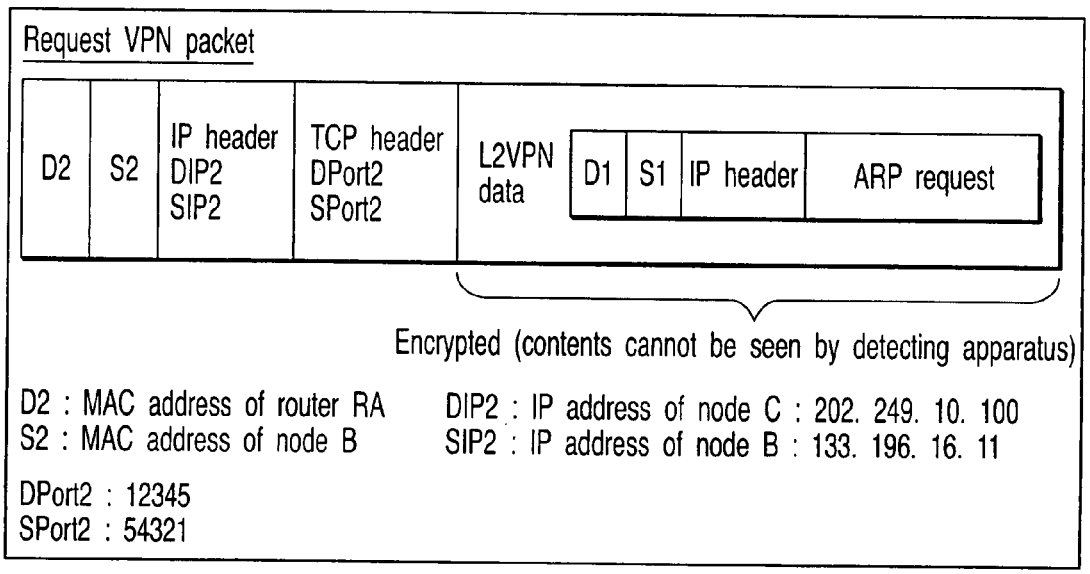
FIG. 24 is a view showing another example of a request VPN packet containing a detection packet transmitted from the node B.

In step S6 in FIG. 22, the node B encapsulates the detection packet to generate a VPN packet (request VPN packet) containing encrypted L2VPN data containing the detection packet like that shown in FIG. 24. The node B transmits this request VPN packet to the router RA.

This request VPN packet passes through the detecting apparatus 1 first. However, as the request VPN packet is input from the internal network, the packet is directly transferred to the router RA side without insertion of the delay time α, as shown in FIG. 22 (step S10).

The router RA removes a MAC header (the destination and transmission source MAC addresses D2 and S2 in FIG. 24) from the received request VPN packet, and transmits the IP packet contained in the request VPN packet to the external network (step S11). In this case, the destination IP address of the IP packet coincides with the IP address "202.249.10.100" of the node C, and the transmission source IP address coincides with the IP address of the node B. The node C receives this IP packet through the router RB (with the MAC header being added to the IP packet).

Figure 25:
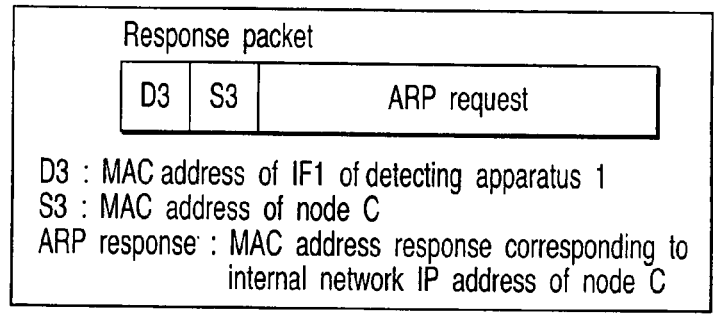
FIG. 25 is a view showing another example of a response packet.

In response to the ARP request contained in the received packet, the node C transmits a response VPN packet addressed to the router RA, which is obtained by encapsulating L2VPN data containing a response packet like that shown in FIG. 25 which is addressed to the "IF1" of the detecting apparatus 1 to return the MAC address of the node C. The router RB removes the MAC header of the response VPN packet, and transmits, to the external network, the IP packet contained in the response VPN packet and addressed to the node B (the destination IP address is the IP address of the node B) (step S12).

The router RA receives the IP packet addressed to the node B. The router RA transmits, to the internal network, a response VPN packet like that shown in FIG. 26, which is obtained by adding a MAC header having the MAC address of the node B as a destination and the MAC address of the router RA as a transmission source to the IP packet (step S13). A response VPN packet like that shown in FIG. 26 is transmitted to the detecting apparatus 1.

Figure 26:
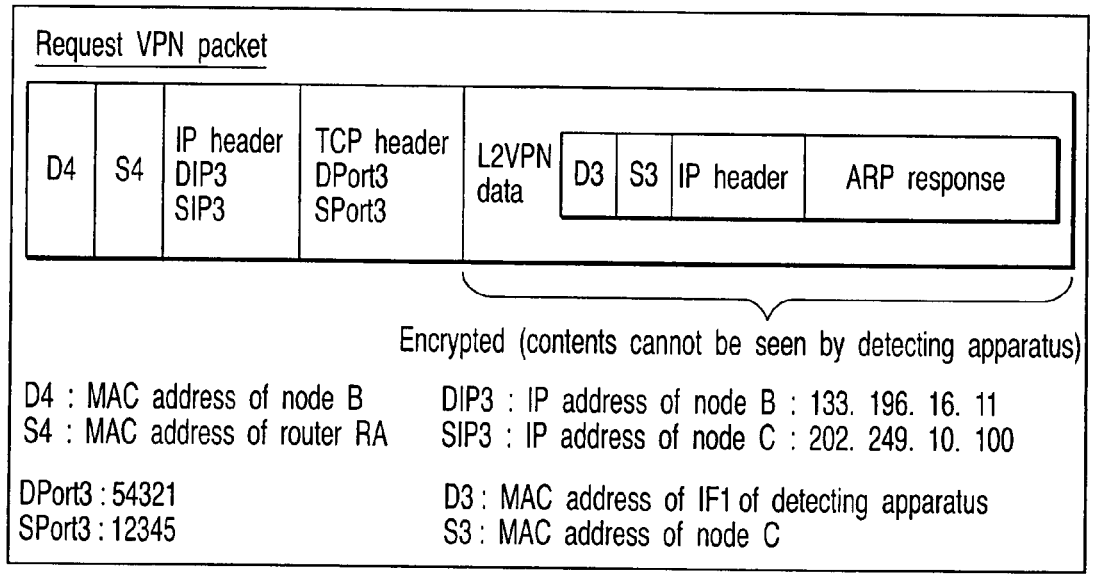
FIG. 26 is a view showing another example of a response packet addressed to the node B, which contains a response packet.

The connection control unit 101 of the detecting apparatus 1 checks packet attribute information such as the protocol number of the packet transmitted from the router RA, a destination IP address in an IP header (DIP3 in FIG. 26), and a transmission source IP address (SIP3 in FIG. 26). If the packet attribute information matches the packet attribute information of the test target node which is notified from the connection control unit 101 in step S1, the connection control unit 101 determines that the corresponding packet is a test target node (step S7), and transfers the packet to the internal network after delaying it by the delay time α (step S8).

If the protocol number of the packet transmitted from the router RA or the packet attribute information of the packet differs from the protocol number of the test target or the packet attribute information notified from the determination unit 102 in step S1, the connection control unit 101 determines that the corresponding packet is not a test target node (step S7). The process then advances to step S9 to transfer the packet to the internal network side without inserting the delay time α.

The VPN packet shown in FIG. 26 is transferred to the internal network through the detecting apparatus 1 and is received by the node B (step S14).

The node B extracts a response packet (see FIG. 25) corresponding to the above detection packet, which contains the MAC address of the IF1 of the detecting apparatus 1 as a destination and the MAC address of the node C as a transmission source, from the L2VPN data contained in the received VPN packet shown in FIG. 26, and transmits the response packet to the internal network (step S15).

In step S16 in FIG. 21, the transceiver unit 103 receives this response packet through the IF1 of the detecting apparatus 1. The transceiver unit 103 determines from the MAC header (D3 and S3 in FIG. 25) of this response packet and the IP header whether the response packet is a response packet from the test target node (the node C in this case). If the transmission source matches the MAC address of the node C and the internal network IP address of the node C, it is determined that the response packet is a response packet from the test target node C, and the process advances to step S17.

In step S17, if the response packet is a packet from the node C, the transceiver unit 103 stores the reception time of the response packet.

The transceiver unit 103 then notifies the determination unit 102 of the difference β between the time of transmission (transmission time) of the detection packet to the test target node C and the time of the reception (reception time) of the response packet in response to the detection packet (step S18).

The determination unit 102 stores the time β notified from the transceiver unit 103 in correspondence with the delay time α (step S19).

The processing from step S1 to step S19 in a case wherein the delay time α (represented by $\alpha_1$ indicating the first delay time) is inserted for one test target packet "D4" is repeated a pre-designated number of times (step S20).

After the processing from step S1 to step S19 is repeated the pre-designated number of times, the process advances to step S21b to change the value of the delay time α (the resultant value will be represented by $\alpha_2$ indicating the second delay time). The processing from step S1 to step S9 is then repeated the pre-designated number of times. The processing from step S1 to step S9 is performed, in which a plurality of (a predetermined number of) delay times α ($\alpha_1, \alpha_2, \ldots$) with different durations are inserted for the same test target packet "ID4", and the values of response times β are measured. Thereafter, the determination unit 102 changes the test target packet (for example, selects unselected packet identification information from the pieces of packet identification information with the designated protocol number "6"), sets the packet with the selected packet identification information as a new test target, and repeats the processing from step S1 to step S9 the pre-designated number of times for each of the plurality of delay times α ($\alpha_1, \alpha_2, \ldots$).

When the above processing is complete with respect to the packets with all the pieces of designated packet identification information (step S21a), the process advances to step S22.

In step S22, the determination unit 102 instructs the connection control unit 101 to stop the insertion of the delay α for a packet passing through the detecting apparatus 1, and instructs the transceiver unit 103 to stop the processing.

Upon receiving the above stop instruction, the connection control unit 101 stops the delay inserting operation shown in FIG. 21 (step S23).

Upon receiving the stop instruction, the transceiver unit 103 stops the processing shown in FIG. 21 (step S24).

The determination unit 102 determines, on the basis of a plurality of measurement results (delay times α and measured response times β) notified from the transceiver unit 103, whether the test target node C connects to the internal network through a VPN tunnel (step S25).

Assume that a test target node is the node C, and packets with pieces of packet identification information "ID1" to "ID4" are test target packets. Assume also that as shown in FIG. 27, the determination unit 102 has set the delay times α inserted for the respective test target packets to "0" and "0.20", has transmitted each detection packet 10 times in each case, and has checked the correlations between the delay times α and the times β required to receive corresponding response packets after the transmission of the detection packets.

Assume that as a result of this processing, the result shown in FIG. 28 is obtained. As shown in FIG. 28, the determination unit 102 calculates the average value of the response times β obtained when a detection packet is transmitted 10 times in each of the cases wherein the delay time α is set to "0" sec and "0.2" sec for each test target packet.

As shown in 28, in the case of the pieces of the packet identification information "ID1" and "ID2", even when the delay time α inserted in the corresponding packet changes when it passes through the detecting apparatus 1, the time (response time) β (average value of β) taken to receive a corresponding response packet after the transmission of the detection packet does not change and is almost constant. That is, the correlation between the delay time α and β is low.

In contrast to this, in the case of the pieces of the packet identification information "ID3" and "ID4", when the delay time α inserted for the corresponding packet changes when it passes through the detecting apparatus 1, the average value of β changes with this change. That is, since the value of β is influenced by a change in the delay time α, the correlation between the delay time α and β is high.

That the correlation between α and β is high indicates that the time (response time) required for the detecting apparatus 1 to receive a response packet after transmitting a detection includes the delay time α inserted when the packet passes through the detecting apparatus 1. That is, packets with the pieces of packet identification information "ID3" and "ID4" are packets transmitted/received between the internal network and the external network through the detecting apparatus 1 and router RA, i.e., packets for VPN communication. Since the correlation between the delay times α inserted for packets with the pieces of packet identification information "ID3" and "ID4" and the times β required to receive response packets after the transmission of detection packets to the test target node C is high, it is determined that the test target node C connects to the internal network through the VPN tunnel.

That is, in this case, it is detected that the node C is a node which connects to the internal network through the VPN tunnel, and the packets with the pieces of packet identification information "ID3" and "ID4" are packets for VPN communication.

According to the third detecting method, after connection monitoring processing, detection processing is performed for packets selected in advance by narrowing down (for example, packets with the protocol number "6" in this case). However, it suffices to perform detection processing of inserting delays in all or some of packets passing through the connection control unit 101 (for example, TCP packets, UDP packets, or packets with high entropy) without performing the above connection monitoring processing. In this case, it is difficult to detect a packet for VPN communication itself, but it is possible to detect, as in the above case, whether a test target node connects through VPN.

5. Fourth Detecting Method: When Detecting Apparatus Discards Packet for Each Connection and Performs Detection The detecting apparatus 1 compares the reachability of packets to a test target node when pre-designated types of packets, of packets to be forwarded, are discarded with that when packets are not discarded to detect whether the test target node is a node on the external network and connects to the internal network through the VPN tunnel. If this is detected, it can be determined that packets discarded in this case include VPN packets exchanged with the test target.

In this case, a packet identified by attribute information such as a MAC address, an IP address, a communication protocol such as IPv4, IPv6, TCP, or UDP, and a port number such as TCP or UDP is called a "connection". For example, a packet having attribute information including a transmission source IP address "A", destination IP address "B", transmission source TCP port number "C", and destination TCP port number "D" will be called a connection.

A connection monitoring processing operation for obtaining attribute information for identifying each packet passing through the router RA, which is performed as preprocessing for detection processing which is performed to detect a node connecting through VPN and a packet for VPN communication, will be described first as in the case of the third detecting method described above.

A detecting method of detecting a node connecting through VPN and a packet for VPN communication by using the connection control table shown in FIG. 20, which is obtained by connection monitoring processing, will be described next with reference to the flowchart shown in FIG. 29.

Figure 29:
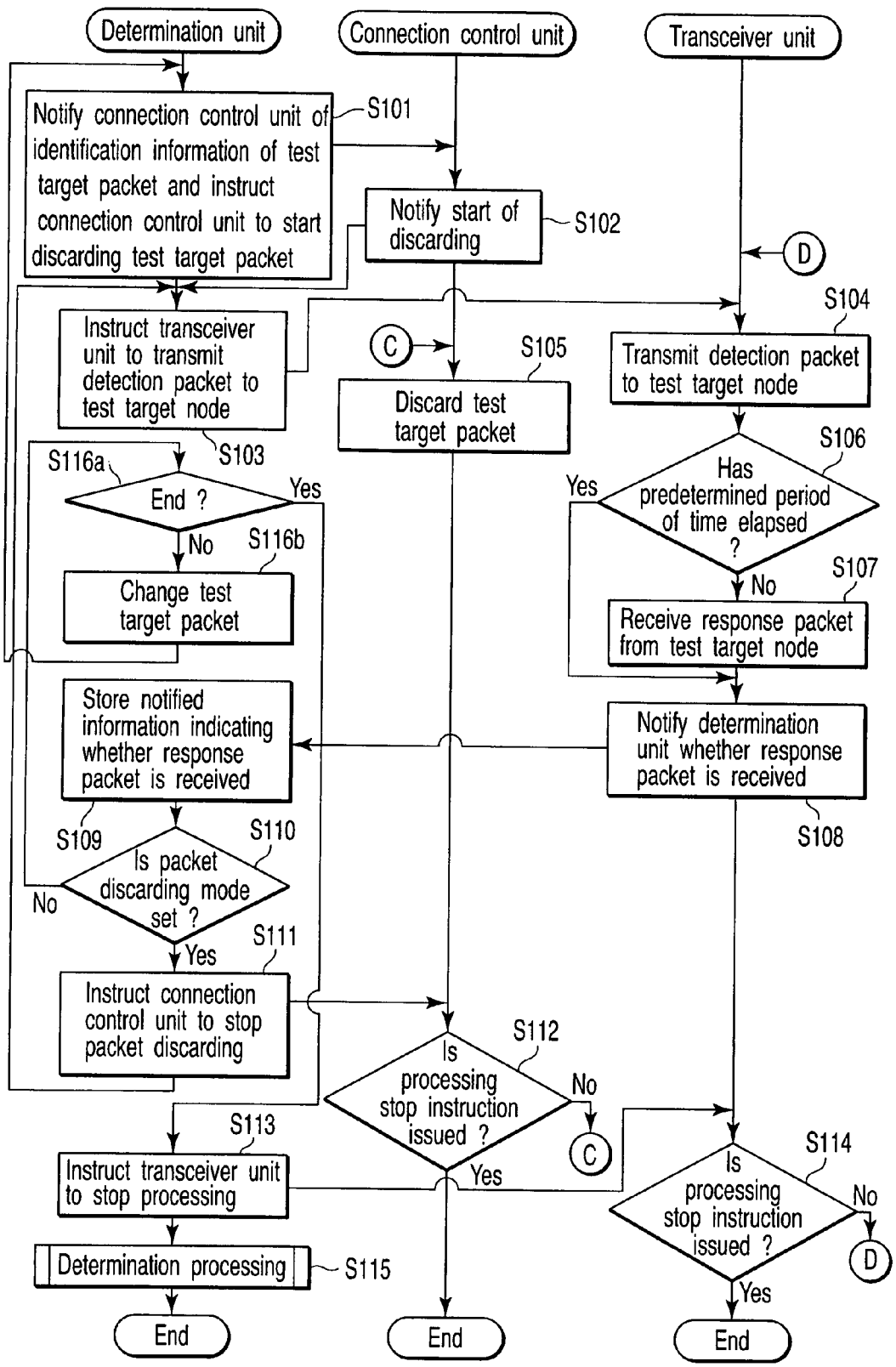
FIG. 29 is a flowchart for explaining the processing operation of a relay apparatus to which the fourth detecting method of detecting VPN communication by discarding a test target packet selected in advance from packets passing through the relay apparatus is applied.

Note that the same reference numerals as in FIG. 29 denote the same steps in FIG. 18.

First of all, the detecting apparatus 1 is provided in advance with the MAC address and IP address of a test target node (the node C in this case). In addition, the user designates the packet identification information or a packet which is to be a test target or packet attribute information among the packet identification information stored in the connection control table shown in FIG. 20. For example, assume that the user has designated pieces of information with the protocol number "6" contained in packet attribute information, i.e., pieces of packet identification information "ID1" to "ID4", among the packet identification information in the connection control table shown in FIG. 20.

Referring to FIG. 29, the determination unit 102 then selects one piece of packet identification information of the designated pieces of packet identification information "ID1" to "ID", and sets the packet with the selected packet identification information as a test target node. The determination unit 102 notifies the connection control unit 101 of the packet identification information of this test target node (or the packet identification information and packet attribute information made to correspond to the packet identification information), and instructs the connection control unit 101 to discard the test target packet when it passes through the detecting apparatus 1 (step S101).

The following description will exemplify a case wherein the packet with the packet identification information "ID4" is selected, and the packet with the packet identification information "ID4" is set as a test target packet.

Note that the packet with the packet identification information "ID4" has the IP address of the IF1 as a destination IP address and the IP address "202.249.10.100" of the node C as a transmission source IP address. Therefore, this test target packet propagates from the external network and passes through the detecting apparatus 1 through the router RA.

Upon receiving an instruction to discard a packet with the packet identification information "ID4" from the determination unit 102, when the corresponding packet passes through, the connection control unit 101 notifies the determination unit 102 that it is ready to discard the packet, i.e., start packet discarding (step S102).

The determination unit 102 instructs the transceiver unit 103 to transmit a detection packet to a test target node (e.g., the node C in this case), together with the MAC address of the test target node and an IP address (e.g., the internal network IP address of the node C) (step S103).

Upon receiving this instruction, the transceiver unit 103 transmits the detection packet to the test target node (step S104). A detection packet uses a packet designed to receive a response to a request (based on, for example, ICMPecho (ICMP echo request), ARP, or ICMPv6ND). For example, a detection packet like that shown in FIG. 13 is transmitted.

If the test target node is located at the end point of the VPN tunnel, the node B receives the detection packet first as described in the first detecting method. The node B encapsulates the detection packet to generate a VPN packet (request VPN packet) containing encrypted L2VPN data containing the detection packet like that shown in FIG. 14. The node B transmits this request VPN packet to the router RA. The above request VPN packet passes through the detecting apparatus 1.

The connection control unit 101 checks pieces of packet attribute information, such as the protocol numbers of the packets input from the internal network side and the router RA side, destination IP addresses in IP headers (DIP2 in FIG. 14 and DIP3 in FIG. 15), and transmission source IP addresses (SIP2 in FIG. 14 and SIP3 in FIG. 15). If it is determined in step S101 that the attribute information matches the attribute information of the test target packet notified from the connection control unit 101, the connection control unit 101 determines that the corresponding packet is a test target packet, and discards the packet (step S105). Packets other than the test target packet are made to pass through.

Note that since the request VPN packet shown in FIG. 14, which is transmitted from the node B, differs in attribute information from the current test target packet, the router RA removes a MAC header (D2 and S2 in FIG. 14) from the request VPN packet, and transmits the IP packet contained in the request VPN packet to the external network. Note that in this case, the destination IP address of the IP packet is the IP address "202.249.10.100" of the node C, and the transmission source IP address is the IP address of the node B. The node C receives this IP packet through the router RB (with a MAC header being added to the IP packet).

The node C transmits a response VPN packet obtained by encapsulating L2VPN data containing a response packet like that shown in FIG. 16, which is addressed to the "IF1" of a detecting apparatus 2 and contains an ICMP echo response to the ICMP echo request contained in the received packet. The router RB removes the MAC header of this response VPN packet, and transmits, to the external network, an IP packet addressed to the node B (with the destination IP address coinciding with the IP address of the node B) contained in the response VPN packet.

The router RA receives the IP packet addressed to the node B. The router RA transmits, to the connection control unit 101, a response VPN packet like that shown in FIG. 15, which is obtained by adding a MAC header having the MAC address of the node B as a destination and the MAC address of the router RA as a transmission source to the IP packet.

The response VPN packet shown in FIG. 15 is the current test target packet with the packet identification information "ID4".

If the packet shown in FIG. 15 (with the packet identification information "ID4") is input to the detecting apparatus 1 through the router RA, since the above attribute information of the packet matches the attribute information of the current test target packet, the connection control unit 101 discards the test target packet (step S105). For this reason, a response VPN packet like that shown in FIG. 15 which propagates from the test target node C to the node B does not reach the node B. As a consequence, the transceiver unit 103 does not receive the above response packet like that shown in FIG. 16 from the node C (step S107) during a predetermined period of time after the transmission of a detection packet addressed to the node C (step S106).

On the other hand, packets other than the above test target packet pass through the detecting apparatus 1 without being discarded. If, therefore, the test target packet is not a request VPN packet containing a detection packet to be received by the test target node C or a response VPN packet containing the above response packet from the node C, since the packet is not discarded by the connection control unit 101, the transceiver unit 103 receives the above response packet like that shown in FIG. 16 from the node C (step S107) during a predetermined period of time after the transmission of a detection packet addressed to the node C (step S106).

Assume that the test target node C is a node on the internal network. In this case, even if the connection control unit 101 of the detecting apparatus 1 discards a packet passing through the detecting apparatus 1, the detection packet transmitted from the transceiver unit 103 does not pass through the detecting apparatus 1 and hence reaches the node C. Upon receiving the detection packet, the node C transmits a response packet like that shown in FIG. 16. As a consequence, the transceiver unit 103 receives the above response packet like that shown in FIG. 16 from the node C (step S107) during a predetermined period of time after the transmission of the detection packet addressed to the node C (step S106).

When the transceiver unit 103 receives the above response packet from the node C after the lapse of the above predetermined period of time or during the above predetermined period of time, the process advances to step S108.

In step S108, the transceiver unit 103 notifies the determination unit 102 whether a response packet is received from the node C.

Upon receiving this notification, the determination unit 102 stores information indicating whether the notified response packet is received (step S109).

With the processing from step S101 to step S109 described above, when the connection control unit 101 is to discard a test target packet having attribute information made to correspond to the packet identification information "ID4", it checks whether to receive a response packet from the node C within a predetermined period of time after the transmission of a detection packet, and the process then advances from step S110 to step S111. When the connection control unit 101 is not to discard the test target packet, it checks whether to receive a response packet from the node C. For this purpose, first of all, an instruction to stop packet discarding is issued to the connection control unit 101 in step S111. Upon receiving this instruction, the connection control unit 101 stops packet discarding. Thereafter, the determination unit 102 returns to step S103 to instruct the transceiver unit 103 again to transmit a detection packet addressed to the test target node C.

Upon receiving this instruction, the transceiver unit 103 transmits a detection packet to the test target node (step S104). In this case, the request VPN packet transmitted from the node B and addressed to the router RA passes through the detecting apparatus 1 and reaches the node C through the router RB. A response VPN packet like that shown in FIG. 15, which contains the response packet transmitted from the node C and shown in FIG. 16, i.e., a packet containing the IP address of the node B as a destination IP address and the IP address (202.249.10.100) of the node C as a transmission source IP address, passes through the detecting apparatus 1 without being discarded by the connection control unit 101. Therefore, the above response packet like that shown in FIG. 16 is transmitted through the node B. As a consequence, the transceiver unit 103 receives the above response packet like that shown in FIG. 16 from the node C (step S107) during a predetermined period of time after the transmission of the detection packet addressed to the node C (step S106).

When the transceiver unit 103 receives the above response packet from the node C after the lapse of the above predetermined period of time or during the predetermined period of time, the process advances to step S108.

In step S108, the transceiver unit 103 notifies the determination unit 102 of information indicating whether it has received a response packet from the node C.

Upon receiving this notification, the determination unit 102 stores information indicating whether the notified response packet is received or not (step S109). The process then advances to step S116b through step S116a to change the test target packet to an unselected packet of the designated packet group. The process then advances to step S101 to instruct the connection control unit 101 to start discarding the new test target packet. Subsequently, in steps S102 to S110, a detection packet is transmitted to the test target node C and check whether a response packet is received, in the case of discarding the new test target packet and the case of not discarding the packet.

When the above processing is complete with respect to all packets with the designated packet identification information (step S116a), the process advances to step S113 to instruct the transceiver unit 103 to stop the processing.

Upon receiving this stop instruction, the transceiver unit 103 stops the processing shown in FIG. 29 (step S114).

The determination unit 102 determines, on the basis of the information notified from the transceiver unit 103, which indicates whether a response packet is received or not when packet discarding is performed, whether the test target node C connects to the internal network through the VPN tunnel (step S115).

In step S115, although the connection control unit 101 receives a response packet from the node C when not discarding a given test target packet, when the connection control unit 101 discards the test target packet and does not receive any response packet from the node C, the connection control unit 101 detects that the test target node C connects to the internal network through the VPN tunnel. In addition, the connection control unit 101 detects that the test target packet is a packet for VPN communication with the node C.

When the connection control unit 101 receives a response packet from the node C even though the unit discards any test target packet of a designated packet group, the currently designated packet group, i.e., a packet group with the protocol number "6", may not include any packet for VPN communication with the node C, or the test target node C may not be a node which connects from the external network to the internal network through VPN communication. Therefore, with respect to another packet group (e.g., a packet group with the protocol number "17"), a detection packet like that shown in FIG. 29 is transmitted to the test target node C to check whether any response packet is received.

Repeating this processing makes it possible to detect a packet for VPN communication with the node C from any of such packet groups, when the test target node C connects to the internal network through the VPN tunnel.

Referring to FIG. 29, it is preferable to transmit a detection packet a predetermined number of times in each of the cases wherein test target packets are discarded and not discarded, and to check in each case whether a response packet is received.

Assume that a test target node is the node C, and packets with pieces of packet identification information "ID1" to "ID4" are test target packets. Assume also that in this case, as shown in FIG. 30, the determination unit 102 has transmitted a detection packet 10 times with respect to each test target packet in the case of discarding all packets and in the case of not discarding the test target packets, and checked the reception of response packets in both the case of discarding the test target packets and the case of not discarding the test target packets.

Assume that, as a result of this operation, the result shown in FIG. 31 is obtained. As shown in FIG. 31, the determination unit 102 calculates response packet reception ratios, for each test target packet, which indicate the numbers of times response packets are received when packets are discarded and not discarded.

As shown in FIG. 31, in the case of the pieces of packet identification information "ID1" and "ID2", the packet reception ratio obtained when the corresponding packets are discarded as they pass through the detecting apparatus 1 is 100%, which is the same as that obtained when the packets are not discarded. Even if packets are discarded, response packets corresponding to detection packets can always be received. That is, the correlation between packet discarding and a response packet reception ratio is low.

In contrast to this, in the case of the pieces of packet identification information "ID3" and "ID4", when corresponding packets are made to pass through the detecting apparatus 1 without being discarded, response packets can always be received (the response packet reception ratio is 100%). When the packets are discarded, the response packet ratio is "0". That is, the correlation between packet discarding and a response packet reception ratio is high. As a consequence, it is detected that packets with the pieces of packet identification information "ID3" and "ID4" are packets which are transmitted/received between the internal network and the external network through the detecting apparatus 1 and the router RA, i.e., packets for VPN communication. It is therefore determined that the test target node C connects to the internal network through the VPN tunnel.

According to the fourth detecting method, after connection monitoring processing is performed, detection processing is performed for packets narrowed down in advance (e.g., packets with the protocol number "6"). However, it suffices to perform detection processing of discarding all or some of packets (e.g., TCP packets, UDP packets, or packets with high entropy) passing through the connection control unit 101 without performing the above connection monitoring processing. In this case, it is difficult to detect a packet for VPN communication itself, but it is possible to detect whether a test target packet connects through VPN, as in the above case.

The third and fourth detecting methods have been described by exemplifying the case wherein a VPN packet based on L2VPN is detected. However, the present invention is not limited to this, and can even be applied to a case wherein a packet based on L3VPN (IPsec or the like), i.e., a packet for VPN communication through an IPIP tunnel (Mobile IP/IPV6, 6 to 4 tunnel, or the like) is detected by checking the correlation between the inserted delay time α and the measured response time β.

The third and fourth detecting methods use a destination IP address, transmission source IP address, protocol number, and the like in an IP header as attribute information for identifying each packet. However, the present invention is not limited to this. For example, when IPv6 is to be used as an IP protocol, a flow ID, a traffic class, and the like in an IP header may be used.

These methods can also use, as attribute information for identifying each packet, a transmission source port number and destination port number in a TCP header, a transmission source port number and destination port number in a UDP header, SPI (Security Parameter Index) in AH (Authentication Header) in a case wherein an IP protocol is IPsec, SPI (Security Parameter Index) in an ESP (Encapsulated Security Payload) header, the randomness (entropy value) of a packet payload, and the like.

The high randomness (entropy value) of a packet payload indicates the high randomness of data, and hence indicates a high possibility that the data is encrypted.

The third and fourth detecting methods use ICMP echo requests as detection packets in connection monitoring processing. However, the present invention is not limited to this. For example, it suffices to use packets (frames) which demand no responses as long as they reach a test target node (e.g., the node C) for which it is to be determined whether the node connects through VPN.

The third detecting method uses an ARP request as a detection packet in detection processing, and the fourth detecting method uses an ICMP echo request as a detection packet in detection processing. However, the present invention is not limited to this. For example, it suffices to use packets (frames) which reach a test target node (e.g., the node C) for which it is to be determined whether the node connects through VPN and are allowed to expect responses. For example, these methods may use, as detection packets, ARP request frames in the case of IPv4, RARP request frames, ICMP/ICMPV6 echo requests, and ICMPv6ND packets.

In addition, the connection control unit 101 may performs connection monitoring without waiting for the designation of the start of monitoring. Although this processing is performed to select the type of packet as a test target, when all the types of packets are to be inspected, inspection can be executed without performing connection monitoring.

Alternatively, it suffices to perform connection monitoring processing without transmitting any detection packet. In this case, however, since no VPN communication may occur during connection monitoring, performing connection monitoring while transmitting a detection packet improves the detection accuracy of VPN communication, as shown in FIG. 19.

6. Examples of Applications of Third and Fourth Detecting Methods

Examples of applications of the third and fourth detecting methods will be described next.

Referring to FIG. 7, assume that the node A is a moving image distribution server. For the protection of the copyright of moving images, the node A wants to reject connection from a node which connects to the internal network through VPN. However, the node A cannot easily know whether a given node connects through VPN. For this reason, when, for example, the node C tries to connect to the node A, the node A makes the detecting apparatus 1 to check whether the node C connects from the external network through VPN. For example, the node A transmits a detection processing request containing the MAC address and IP address of the test target node C to the detecting apparatus 1. Upon receiving this detection processing request, the detecting apparatus 1 performs connection monitoring processing and detection processing like those described above, thereby detecting whether the node C connects through VPN and also detecting a packet (its attribute information) for VPN communication.

Upon receiving the notification of such a detection result from the detecting apparatus 1, the node A can perform control such as rejecting access from the node C through VPN.

In order to prevent the leakage of confidential information such as personal information, defense-related information, or the like, it is preferable to prevent a node on the external network from performing VPN communication without permission from the internal network. If, however, it cannot be known which packet is for VPN communication, the detecting apparatus 1 performs connection monitoring processing and detection processing like those described above to detect that the node C connects through VPN and also detect a packet (its attribute information) for VPN communication.

Subsequently, the detecting apparatus 1 checks the above attribute information of the packet input from the internal network. If the attribute information matches that of the detected packet for VPN communication, the detecting apparatus 1 discards the packet to prevent it from being output from the internal network. The detecting apparatus 1 also checks the attribute information of the packet input from the router RA side. If the attribute information matches that of the detected packet for VPN communication, the detecting apparatus 1 discards the packet to prevent it from being input to the internal network.

As described above, according to the first to fourth detecting methods of the first embodiment, it is easy to detect a node on the external network which is performing VPN communication with a node on the internal network.

In addition, according to the third and fourth detecting methods of the first embodiment, it is easy to detect a node on the external network which is performing VPN communication with a node on the internal network and also detect a packet, of communication packets transmitted/received between a node on the internal network and a node on the external network, which is used for the VPN communication.

Second Embodiment

The first embodiment has exemplified the case wherein the detecting apparatus 1 comprises the connection control unit 101, determination unit 102, and transceiver unit 103.

The second embodiment will exemplify a case wherein the function of the detecting apparatus 1 described above is divided into two parts, the detecting apparatus (a detecting apparatus 2 in this case) includes a determination unit 102 and a transceiver unit 103, and a connection control unit 101 comprises a relay apparatus such as a router RA connecting between an internal network and an external network.

1. Arrangements of Detecting Apparatus and Forwarding Apparatus

FIG. 32 shows examples of the arrangements of the detecting apparatus 2 and relay apparatus RA according to the second embodiment. The same reference numerals as in FIG. 32 denote the same parts in FIG. 6.

As in the first embodiment, the detecting apparatus includes the determination unit 102 and the transceiver unit 103, and further includes a communication unit 104 for performing communication for the above connection monitoring processing and detection processing with the router RA. The router RA includes the connection control unit 101, and further includes a communication unit 105 for performing communication for the above connection monitoring processing and detection processing with the detecting apparatus 2.

FIG. 33 shows an example of a network arrangement in which the detecting apparatus 2 in FIG. 32 is placed in the internal network.

Packets propagating from the internal network to the external network and packets propagating from the external network to the internal network pass through the router RA without fail. Therefore, according to the second embodiment, the router RA comprises the connection control unit 101 which inserts a delay time (a) and discards packets as described in the first embodiment. This makes it unnecessary for the detecting apparatus 2 to be placed at a position at which packets propagating from the internal network to the external network and packets propagating from the external network to the internal network pass through the detecting apparatus without fail. The detecting apparatus 2 is placed at an arbitrary position in the internal network, as shown in FIG. 32.

In this case, the router RA as a relay apparatus comprises the connection control unit 101. However, the present invention is not limited to this. The relay apparatus comprising the connection control unit 101 may be any apparatus as long as it is a communication apparatus which can forward a packet between the internal network and the external network and perform delay insertion and packet discarding. For example, this apparatus may be a communication apparatus such as a router, firewall, or hub having such a function.

Referring to FIG. 33, the internal network is, for example, an IPv4 subnet with "133.196.16.0/24", and a communication apparatus corresponding to the node C connects to the internal network through L2VPN. This L2VPN uses TCP for data distribution.

Different points between the first and second embodiments will be described below.

The second embodiment differs from the first embodiment in that the second embodiment is designed to exchange information between the determination unit 102 and the connection control unit 101 (e.g., the instructions in steps S1 and S22 in FIGS. 8 and 21, the notification in step S2, the instructions in steps S101 and S111 in FIGS. 18 and 29, the instructions in steps S201 and S214 in FIG. 19, and the notifications in steps S202 and S215) through communication between the communication unit 104 and the router RA and the communication unit 105.

Assume that packets to be exchanged between a node existing in the internal network and a node on the external network which connects to the internal network through the VPN tunnel are transferred from the internal network to the external network and from the external network to the internal network. In this case, in the first embodiment, the packets pass through both the detecting apparatus 1 and the router RA. In contrast, in the second embodiment, the packets pass through only the router RA.

The first to fourth detecting methods described in the first embodiment can be applied to the detecting apparatus 2 and router RA shown in FIG. 32 in the same manner as in the first embodiment except that in the second embodiment, information is exchanged between the determination unit 102 and the connection control unit 101 through communication between the communication unit 104 of the detecting apparatus 2 and the communication unit 105 of the router RA, and packets transmitted/received between the internal network and the external network pass through the router RA without passing through the detecting apparatus 2.

2. First Detecting Method

Figure 34:
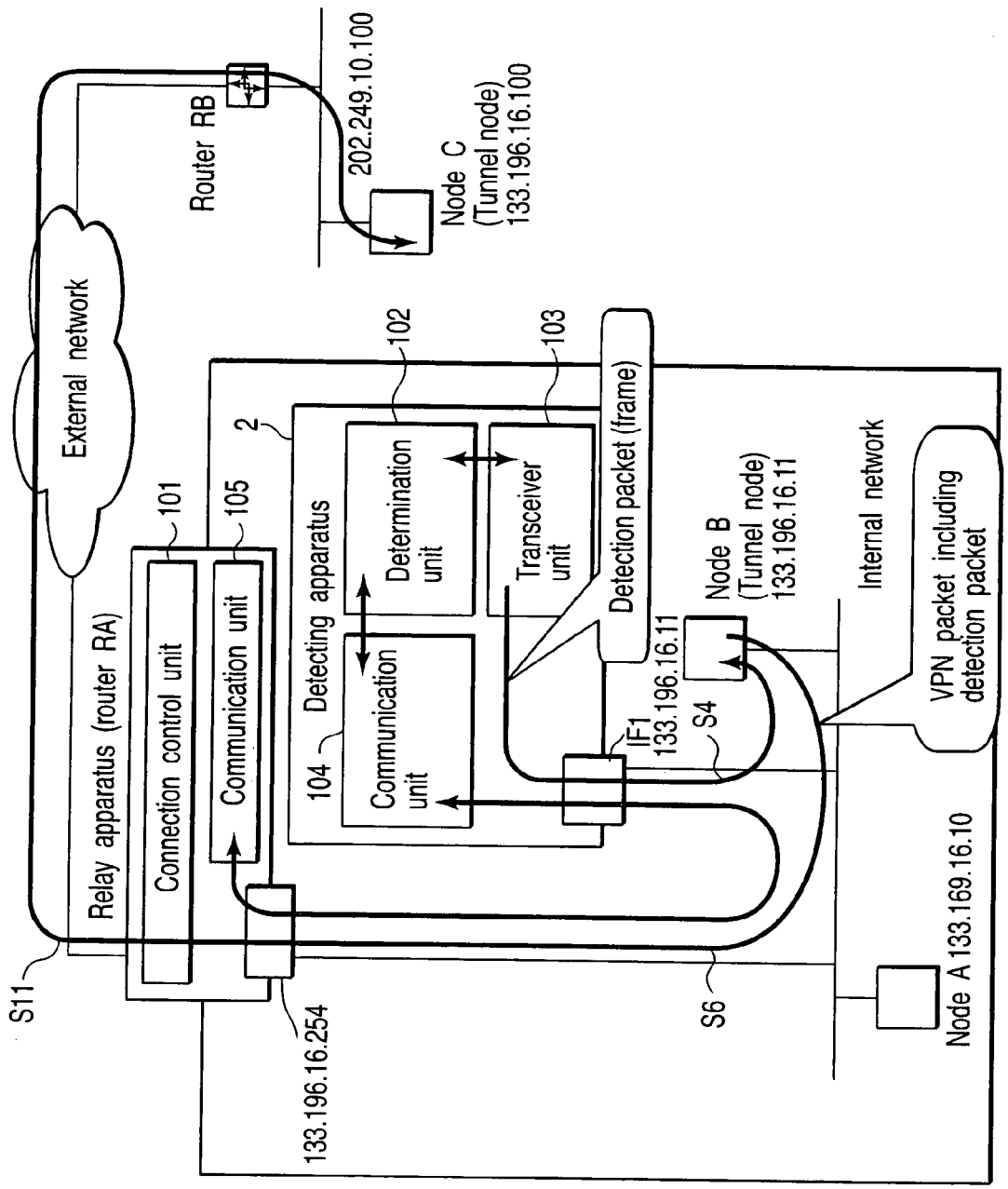
FIG. 34 is a view for explaining the flow of data in a network according to the second embodiment, which shows the flow of data up to the point where a detection packet reaches a node C in a case wherein a test target node is a node which is performing VPN communication with a node on the internal network.
Figure 35:
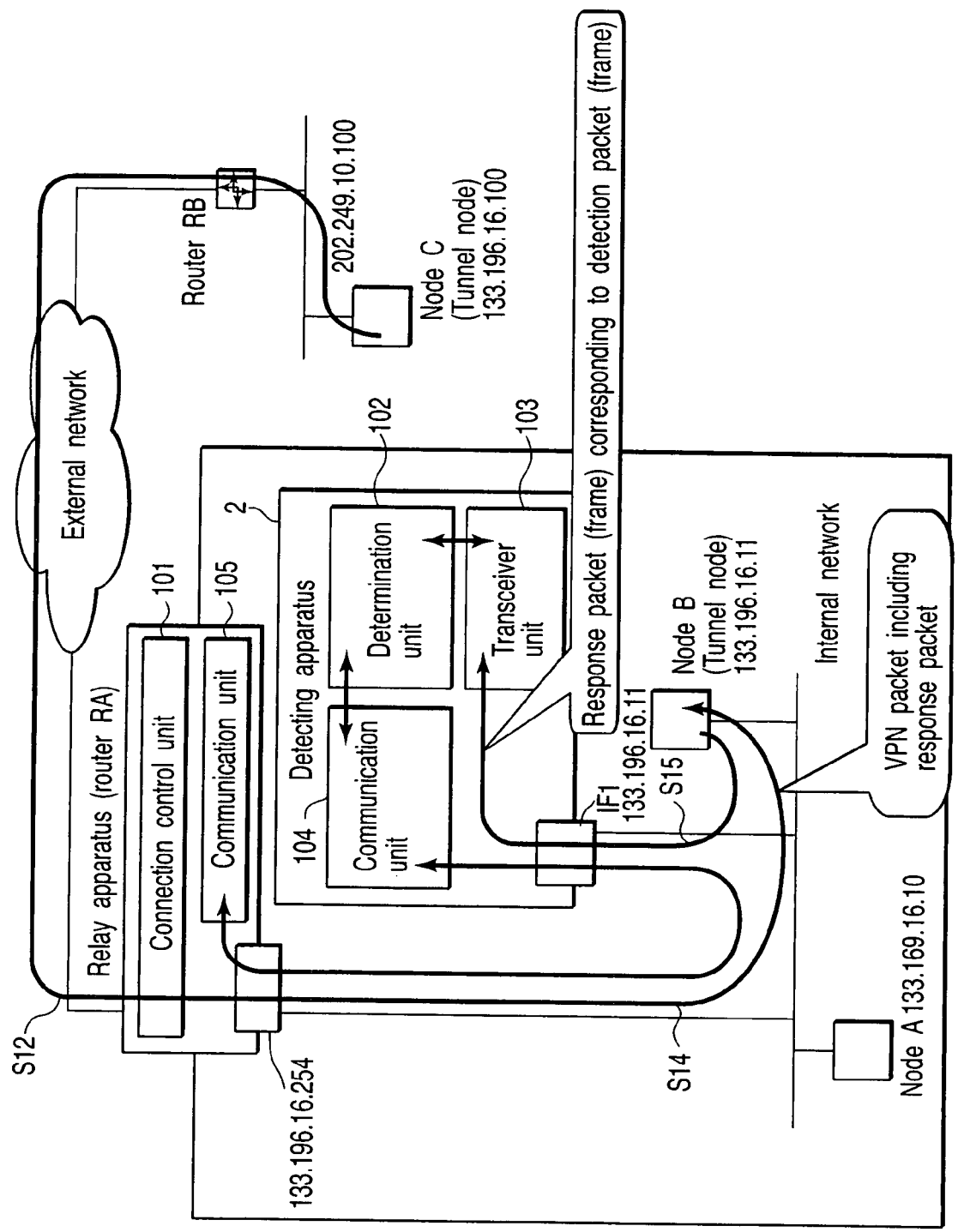
FIG. 35 is a view for explaining the flow of data in a network according to the second embodiment, which shows the flow of data up to the point where a response packet from the node C reaches a detecting apparatus in a case wherein a test target node is a node which is performing VPN communication with a node on the internal network.

The first detecting method according to the second embodiment will be described first with reference to FIGS. 8 and 34 to 36 by exemplifying a case wherein when a test target node is a node C on the external network which connects to the internal network through the VPN tunnel, and a packet propagating from the external network to the internal network passes through the connection control unit 101, the connection control unit 101 inserts a delay time α for the packet. The same reference numerals as in FIGS. 34 to 36 denote the same parts in FIGS. 11, 12, and 9. FIGS. 34 and 35 are views for explaining the flows of data in a network according to the second embodiment. When a test target node is a node which is performing VPN communication with a node on the internal network, FIG. 34 shows the process up to the step in which a detection packet reaches the node C. FIG. 35 shows the process up to the step in which a response packet from the node C reaches the detecting apparatus.

Like the first embodiment, the first detecting method inserts delays in all packets propagating from the external network to the internal network, which are forwarded by the router RA, and checks the correlation between the duration of each inserted delay time and the time (response time) required to receive a response packet after the transmission of a packet (detection packet) demanding a response to a test target node to detect whether the test target node is a node on the external network and connects to the internal network through the VPN tunnel.

The determination unit 102 instructs the connection control unit 101 of the router RA to insert the delay time α (α is a variable value) for a packet passing through the router RA (of the connection control unit 101) through communication units 104 and 105 (step S1).

The connection control unit 101 notifies the determination unit 102 of the start of the insertion of the delay through the communication units 104 and 105 (step S2). Subsequently, when receiving a packet input from the external network, the connection control unit 101 transfers the packet to the internal network after delaying it by the delay time α until the reception of a processing stop instruction from the determination unit 102 (step S22).

The determination unit 102 instructs the transceiver unit 103 to transmit a detection packet to a test target node (e.g., the node C), together with the MAC address and IP address (e.g., the internal network IP address of the node C) (step S3).

As in the same manner shown in FIG. 9, the transceiver unit 103 transmits a detection packet like that shown in FIG. 13 which is addressed to the test target node C in step S4 in FIGS. 34 and 36, and stores the transmission time of the detection packet in step S5 in FIG. 36.

In step S6 in FIGS. 34 and 36, upon receiving the detection packet, a node B encapsulates the detection packet to generate a VPN packet (request VPN packet) containing encrypted L2VPN data containing the detection packet like that shown in FIG. 14. The node B transmits this request VPN packet to the node C (IP address "202.249.10.100").

Upon receiving the above request VPN packet, the router RA removes a MAC header (destination and transmission source MAC addresses D2 and S2 in FIG. 14) from the received request VPN packet, and transmits the IP packet contained in the request VPN packet to the external network (step S11 in FIGS. 34 and 36). In this case, the destination IP address of the IP packet is the IP address "202.249.10.100" of the node B, and the transmission source IP address is the IP address of the node B. The node C receives the IP packet through a router RB (with a MAC header being added to the IP packet).

The node C transmits a response VPN packet addressed to the node B (destination IP address: node B, destination MAC address: router RB), which is obtained by encapsulating L2VPN data containing an ICMP echo response addressed to "IF1" of the detecting apparatus 1. The router RB removes the MAC header of the response VPN packet, and transmits the IP packet addressed to the node B (the destination IP address is the IP address of the node B) contained in the response VPN packet to the external network (step S12 in FIGS. 35 and 36).

The router RA receives the IP packet addressed to the node B. The router RA outputs, to the connection control unit 101, a response VPN packet like that shown in FIG. 15 upon adding a MAC header to the IP packet with the MAC header containing the MAC address of the node B as a destination and the MAC address of the router RA as a transmission source. The connection control unit 101 transfers a packet like that shown in FIG. 15 to the internal network side after delaying the packet by the delay time α (step S8').

Referring to FIG. 36, when a packet propagating from the external network to the internal network passes through the router RA, the delay time α is inserted for the packet in step S8'. However, the present invention is not limited to this. It suffices to insert the delay time α for a packet propagating from the internal network to the external network when the packet is transferred to the external network even in a case wherein the packet pass through the router RA, as well as or instead of inserting the delay time α in step S8'.

When the delay time α is inserted for both a packet propagating from the internal network to the external network and a packet propagating from the external network to the internal network, which pass through the router RA, the total delay time inserted during the time from the instant at which a detection packet is transmitted to the instant at which a corresponding response packet is received is 2α. When the delay time α is inserted for either of them, the total inserted delay time becomes α. In performing determination processing, in the former case, in the strict sense, the correlation between the inserted delay time 2α and the actually measured response time β is checked. In the latter case, the correlation between the inserted delay time α and the actually measured response time β is checked.

The node B receives the VPN packet shown in FIG. 15 which is output from the router RA to the internal network after delaying the packet by the delay time α (step S14 in FIGS. 35 and 36).

The node B extracts a response packet (see FIG. 16) corresponding to the above detection packet, which contains the MAC address of the IF1 of the detecting apparatus 2 as a destination and the MAC address of the node C as a transmission source, from the L2VPN data contained in the received VPN packet shown in FIG. 15, and transmits the response packet to the internal network (step S15 in FIGS. 35 and 36).

The transceiver unit 103 receives this response packet through the IF1 of the detecting apparatus 2.

The processing from step S16 in FIG. 8 is the same as that in the first embodiment.

3. Second Detecting Method

The second detecting method according to the second embodiment will be described next by exemplifying a case wherein when a test target node is the node C on the external network which connects to the internal network through the VPN tunnel, the connection control unit 101 discards a packet passing through the router RA.

Note that the operations of the detecting apparatus 2 and the connection control unit 101 of the router RA in this case are almost the same as those in the second detecting method of the first embodiment (FIG. 18) except that information (e.g., the instructions in steps S101 and S111 in FIG. 18) is exchanged between the determination unit 102 and the connection control unit 101 by communication between the communication unit 104 of the detecting apparatus 2 and the communication unit 105 of the router RA, and a packet transmitted/received between the internal network and the external network directly passes through the router RA without passing through the detecting apparatus 2. The effects of this method are the same as those in the first embodiment described above.

In addition, if a test target node is the node C on the external network which connects to the internal network through the VPN tunnel, the delivery routes of a detection packet and response packet are the same as those in FIGS. 34 and 35.

4. Third Detecting Method

A case wherein the third detecting method described in the first embodiment is applied to the second embodiment will be described next by exemplifying a case wherein a test target node is the node C on the external network which connects to the internal network through the VPN tunnel.

Connection monitoring processing will be described first with reference to the sequence chart shown in FIG. 37. The same reference numerals as in FIG. 37 denote the same parts in FIG. 19, and only different portions between the processing in FIG. 37 and that in FIG. 19 will be described.

Figure 37:
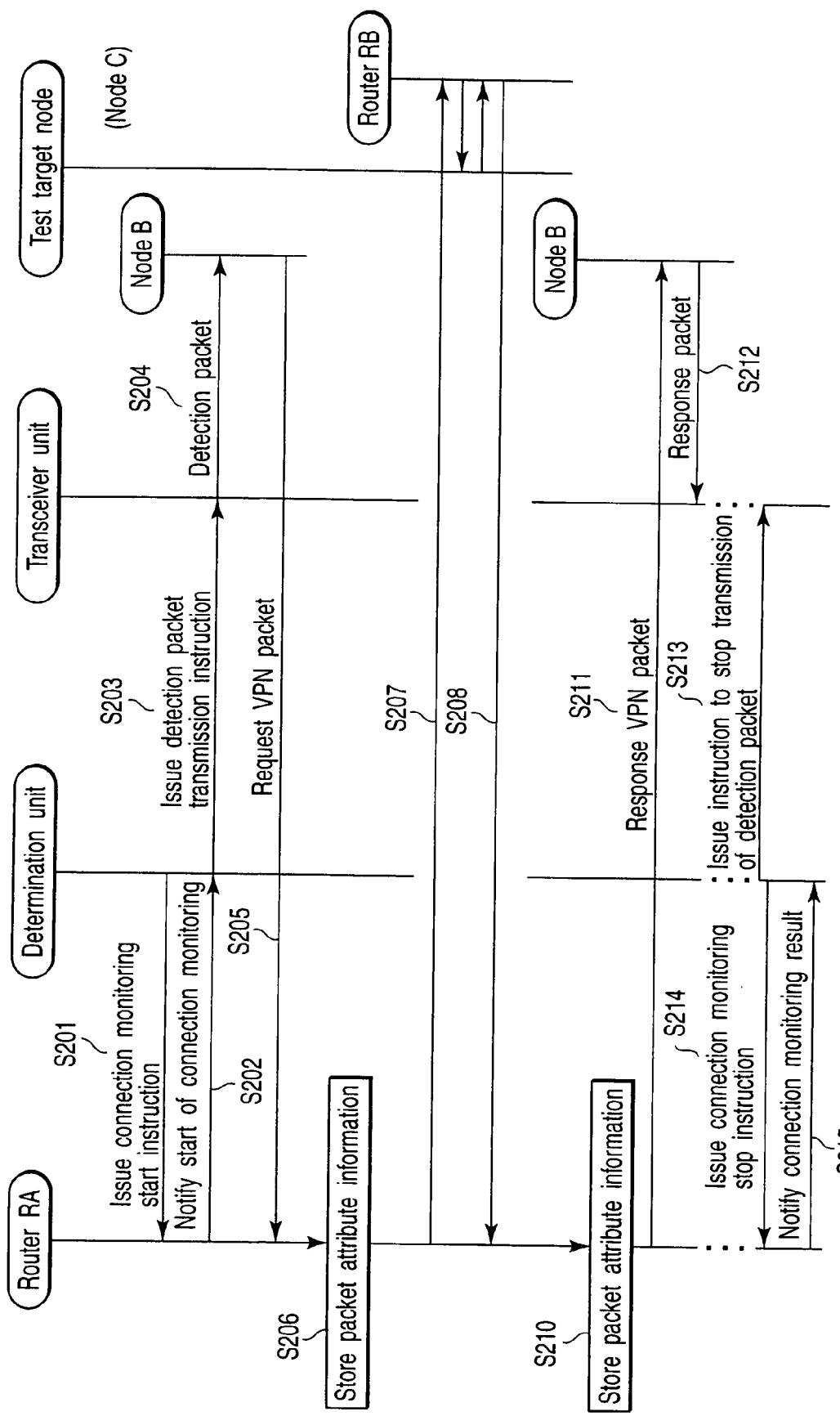
FIG. 37 is a sequence chart for explaining connection monitoring processing in the detecting apparatus and relay apparatus according to the second embodiment.

Referring to FIG. 37, a packet transmitted/received between the internal network and the external network directly passes through the router RA, and hence is transmitted from the node B, and the router RA receives the request VPN packet shown in FIG. 14 first (step S205).

Upon receiving the request VPN packet, the router RA extracts the above packet attribute information from the request VPN packet in the connection control unit 101, and stores this in a connection control table, together with packet identification information (step S206).

The router RA removes the MAC header (the destination and transmission source MAC addresses D2 and S2 in FIG. 14) from the request VPN packet in which the packet attribute information is stored, and transmits the IP packet contained in the VPN packet to the external network (step S207).

The router RA receives first the IP packet addressed to the node B, which is transmitted from the node C to the router RB and is obtained by encapsulating the L2VPN data contained in the ICMP echo response addressed to the detecting apparatus 1 (step S208). The router RA outputs the VPN packet like that shown in FIG. 15 to the connection control unit 101, upon adding a MAC header to the IP packet with the MAC header containing the MAC address of the node B as a destination and the MAC address of the router RA as a transmission source. As in step S206 described above, the connection control unit 101 extracts packet attribute information from the VPN packet shown in FIG. 15, adds this to packet identification information for identifying the packet attribute information, and stores the resultant information in the connection control table (step S210).

The above processing is the same as that shown in FIG. 19 except that information is exchanged between the determination unit 102 and the connection control unit 101 through communication between the communication unit 104 of the detecting apparatus 2 and the communication unit 105 of the router RA. The effects of this processing are also the same as those in the first embodiment described above.

A detecting method of detecting a node connecting through VPN and a packet for VPN communication by using the connection control table shown in FIG. 20 in the detecting apparatus 2 will be described next.

The detecting method will be described below with reference to the flowchart shown in FIG. 21 and the sequence chart shown in FIG. 38.

Figure 38:
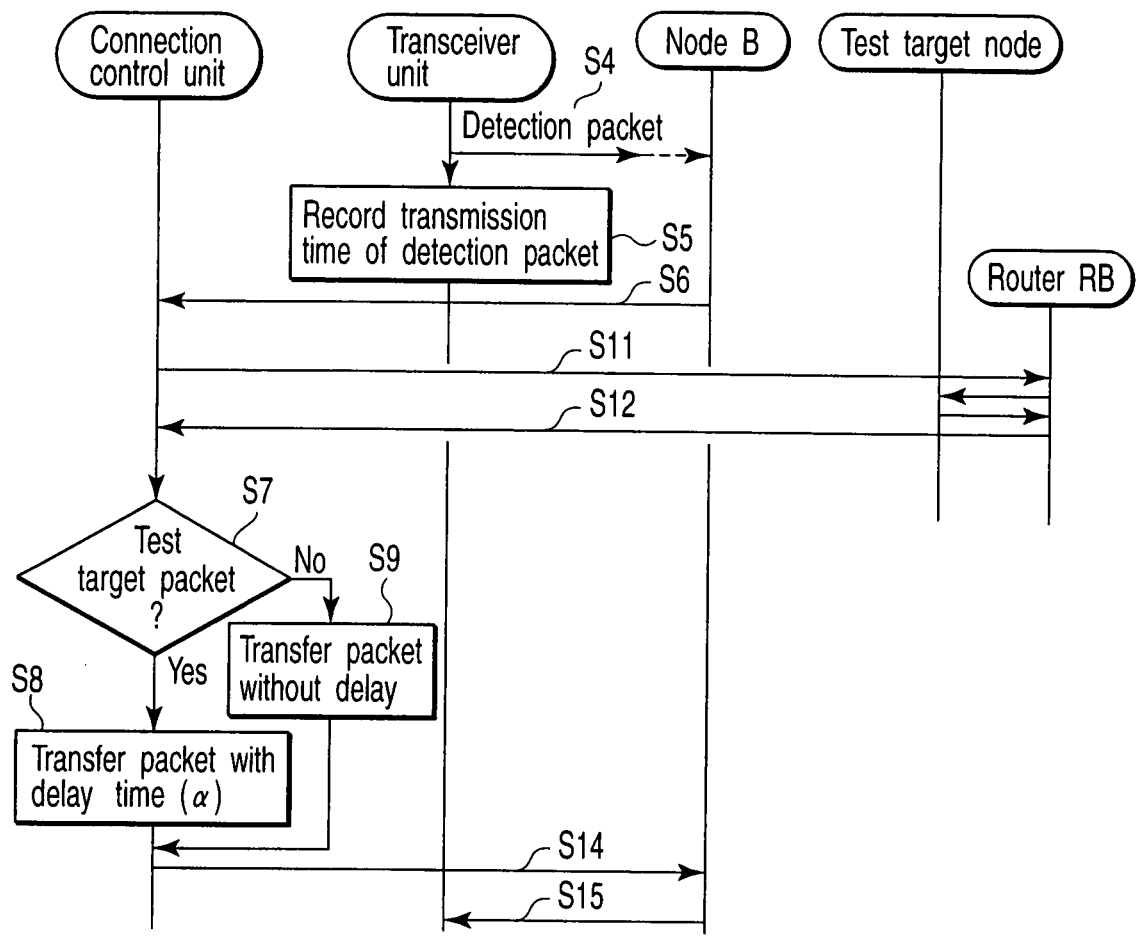
FIG. 38 is a sequence chart for explaining the flow of data in a network in a case wherein the third detecting method is applied to the detecting apparatus and relay apparatus according to the second embodiment, which shows a case wherein a test target node is a node on the internal network.

Although both a packet propagating from the internal network to the external network and a packet propagating from the external network to the internal network pass through the router RA, FIG. 38 exemplifies a case wherein the packet propagating from the internal network to the external network is directly transferred to the external network without insertion of the delay time α, and the delay time α is inserted for the packet propagating from the external network to the internal network. Therefore, the total delay time inserted by the router RA is α, and the correlation between α and β is checked.

The same reference numerals as in FIG. 38 denote the same parts in FIG. 22. The different portions between this processing and that in the first embodiment will be described below.

Referring to FIG. 38, since a packet transmitted/received between the internal network and the external network directly passes through the router RA, the node B transmits the packet. The router RA receives the request VPN packet shown in FIG. 24 first (step S6).

Upon receiving this request VPN packet, the router RA removes a MAC header (the destination and transmission source MAC addresses D2 and S2 in FIG. 24) from the request VPN packet, and directly transmits the IP packet contained in the request VPN packet to the external network (without inserting the delay time α) (step S11).

In this case, the destination IP address of the IP packet is the IP address "202.249.10.100" of the node C, and the transmission source IP address is the IP address of the node B. The node C receives the IP packet through a router RB (with a MAC header being added to the IP packet).

The node C transmits a response VPN packet addressed to the router RA, which is obtained by encapsulating L2VPN data containing a response packet like that shown in FIG. 25 which is addressed to the "IF1" of the detecting apparatus 1 to return the MAC address of the node C. The router RB removes the MAC header of the response VPN packet, and transmits, to the external network, the IP packet contained in the response VPN packet and addressed to the node B (the destination IP address is the IP address of the node B) (step S12).

The router RA receives the IP packet addressed to the node B. The router RA transmits a response VPN packet like that shown in FIG. 26 to the connection control unit 101 upon adding a MAC header to the IP packet with the MAC header containing the MAC address of the node B as a destination and the MAC address of the router RA as a transmission source.

The connection control unit 101 checks packet attribute information such as the protocol number of the response VPN packet, a destination IP address in an IP header (DIP3 in FIG. 26), and a transmission source IP address (SIP3 in FIG. 26). If the packet attribute information matches the packet attribute information of the test target node which is notified from the connection control unit 101 in step S1, the connection control unit 101 determines that the corresponding packet is a test target node (step S7), and transfers the packet to the internal network after delaying it by the delay time α (step S8).

The above processing is the same as that shown in FIG. 22 except that information is exchanged between the determination unit 102 and the connection control unit 101 through communication between the communication unit 104 of the detecting apparatus 2 and the communication unit 105 of the router RA. The effects of the processing are also the same as those in the first embodiment described above.

In addition, if a test target node is the node C on the external network which connects to the internal network through the VPN tunnel, the delivery routes of a detection packet and response packet are the same as those in FIGS. 34 and 35.

4. Fourth Detecting Method

A case wherein the fourth detecting method described in the first embodiment is applied to the second embodiment will be described next by exemplifying a case wherein a test target node is the node C on the external network which connects to the internal network through the VPN tunnel.

Connection control processing is the same as that shown in FIG. 37. A detecting method of detecting a node connecting through VPN and a packet for VPN communication by using the connection control table shown in FIG. 20 in the detecting apparatus will be described with reference to the flowchart shown in FIG. 29.

Note that the operations of the detecting apparatus 2 and the connection control unit 101 of the router RA in this case are almost the same as those in the fourth detecting method of the first embodiment (FIG. 29) except that information (e.g., the instructions in steps S101 and S111 in FIG. 29) is exchanged between the determination unit 102 and the connection control unit 101 by communication between the communication unit 104 of the detecting apparatus 2 and the communication unit 105 of the router RA, and a packet transmitted/received between the internal network and the external network directly passes through the router RA without passing through the detecting apparatus 2. The effects of this method are the same as those in the first embodiment described above.

In addition, if a test target node is the node C on the external network which connects to the internal network through the VPN tunnel, the delivery routes of a detection packet and response packet are the same as those in FIGS. 34 and 35.

As described above, the first to fourth detecting methods of the second embodiment can easily detect a node on the external network which is performing VPN communication with a node on the internal network.

The third and fourth detecting methods of the second embodiment can easily detect a node on the external network which is performing VPN communication with a node on the internal network, and can also easily detect a packet used for the VPN communication of communication packets transmitted/received between the node on the internal network and the node on the external network.

In addition, the above examples of the applications of the first to fourth detecting methods of the first embodiment described above can be directly applied to the second embodiment.

(Detecting Method in Case where there are Plurality of Routes to External Network)

In the first and second embodiments, if there are a plurality of routes from the internal network to the external network, detection is performed by the following methods.

1. When Detecting Apparatus 1 is to be Used:

Installing detecting apparatuses on all routes to the external network makes it possible to perform detection. Otherwise, when VPN communication connects to the outside through a route in which the detecting apparatus 1 is not installed, since the communication cannot be detected, detecting apparatuses must be installed in all the routes.

In addition, the detecting apparatuses 1 need to operate in cooperation with each other. According to the first detecting method of the first embodiment, all the detecting apparatuses 1 installed in the internal network need to simultaneously insert delays.

The third detecting method of the first embodiment notifies at least one predetermined detecting apparatus 1 (to be referred to as a master detecting apparatus hereinafter) of a plurality of detecting apparatuses 1 of the results obtained by the respective detecting apparatuses, designates delay times and packets in which delays are to be inserted with respect to other detecting apparatuses, and instructs them to insert the delays. This makes it possible to perform detection in the same manner as in the above case wherein one detecting apparatus is installed.

2. When Detecting Apparatus 2 is to be Used:

All the relay apparatuses on all the routes to the external network comprise connection control units 101, and need to perform the above operation upon receiving instructions from the detecting apparatus 2 on the internal network.

For example, in the first detecting method of inserting delay times for all packets passing through the relay apparatuses, the detecting apparatus 2 issues instructions to start delay insertion (including designation of delay times) to all the relay apparatuses, and each relay apparatus performs the above delay time inserting operation. This makes it possible to perform detection.

According to the third detecting method of inserting delay times for test target packets of packets passing through relay apparatuses, the detecting apparatus 2 instructs all the relay apparatuses to start connection monitoring. Each relay apparatus notifies the detecting apparatus 2 of a connection control result, i.e., information on a connection control table like that shown in FIG. 20. Making the detecting apparatus 2 instruct each relay apparatus to start delay insertion makes it possible to perform detection in the same manner as in the case wherein one relay apparatus is used.

If there are a plurality of detecting apparatuses 2, each relay apparatus notifies at least one predetermined detecting apparatus 2 (master detecting apparatus) of the plurality of detecting apparatuses 2 of the result obtained by connection monitoring. Upon receiving this notification, the master detecting apparatus issues a delay insertion start instruction or the like to each relay apparatus on the basis of the connection monitoring result notified from each relay apparatus.

(Method of Selecting Test Target Packet)

In the third and fourth detecting methods according to the first and second embodiments, even if all types of packets passing through the detecting apparatus 1 or the connection control unit 101 in the relay apparatus are set as test targets, VPN communication (packets and nodes) can be detected. If, however, the number of types of packets is large (the number of connections is large), the processing amount for detection processing is large. This may make it difficult to execute the method.

In order to solve this problem, a method of selecting test target packets under the following conditions is conceivable:

a packet which is clearly based on a known VPN protocol (e.g., PPTP, L2TP, or IPsec);

a packet which seems to be encrypted; and a packet based on an unknown protocol (e.g., with an unknown protocol number or unknown header).

Checking the entropy of data in a packet makes it possible to estimate whether the communication is encrypted.

Properly selecting a type of packet as a test target in accordance with an environment in which a detecting apparatus operates, e.g., the throughput of the detecting apparatus, a network environment in which the detecting apparatus is installed, and the detection accuracy required for the detecting apparatus will lead to a reduction in load on the detecting apparatus.

As described above, the embodiments described above can easily detect a node on an external network which is performing VPN communication with a node on an internal network, and can easily detect a packet, of communication packets transmitted/received between a node on an internal network and a node on an external network, which is used for VPN communication.

What is claimed is:

1. A VPN (Virtual Private Network) communication detecting method of detecting VPN communication between a first VPN node and a second VPN node, the first VPN node being on an internal network and the second VPN node being on an external network, the internal and the external networks connected through a relay apparatus and detecting apparatus of the internal network, comprising:

transmitting, by the detecting apparatus, a first response request packet to the second VPN node, wherein the transmitting further comprises:
receiving the first response request packet at the first VPN node;
generating a first request VPN packet by encapsulating and encrypting the first response request packet, the payload of the first request VPN packet not readable by the detecting apparatus;
sending the first request VPN packet to the second VPN node via the detecting apparatus;

delaying, by the relay apparatus or the detecting apparatus, at least one of packets passing through the relay apparatus or the detecting apparatus by a first delay time, the at least one of packets each transmitting from one of the internal network and the external network to the other of the internal network and the external network;

receiving, by the detecting apparatus, a first response packet from the second VPN node in response to the first response request packet, wherein the receiving further comprises:
receiving, by the detecting apparatus, a first VPN response packet from the second node, the payload of the first response VPN packet not readable by the detecting apparatus;
forwarding the first VPN response packet to the first node, wherein the first node de-encapsulates and decrypts the first VPN response packet to generate the first response packet;
receiving, by the detecting apparatus, the first response packet from the first VPN node:

measuring, by the detecting apparatus, a first response time which is from a first time point when the first response request packet is transmitted to a second time point when the first response packet is received and storing the first response time;

transmitting, by the detecting apparatus, a second response request packet to the second VPN node, wherein transmitting further comprises:
receiving the second response request packet at the first VPN node;
generating a second request VPN packet by encapsulating and encrypting the second response request packet, the payload of the second request VPN packet not readable by the detecting apparatus;

sending the second request VPN packet to the second VPN node via the detecting apparatus;

delaying, by the relay apparatus or the detecting apparatus, at least one of packets passing through the relay apparatus or the detecting apparatus by a second delay time which is different from the first delay time, the at least one of packets each transmitting from one of the internal network and the external network to the other of the internal network and the external network;

receiving, by the detecting apparatus, a second response packet from the second VPN node in response to the second response request packet, wherein the receiving further comprises:

receiving, by the detecting apparatus, a second VPN response packet from the second node, the payload of the second response VPN packet not readable by the detecting apparatus;

forwarding the second VPN response packet to the first node, wherein the first node de-encapsulates and decrypts the second VPN response packet to generate the second response packet;

receiving, by the detecting apparatus, the second response packet from the first VPN node;

measuring, by the detecting apparatus, a second response time which is from a third time point when the second response request packet is transmitted to a fourth time point when the second response packet is received and storing the second response time; and determining, by the detecting apparatus, that the second VPN node connects to the internal network through the VPN communication, when the first response time and the second response time change in accordance with a difference between the first delay time and the second delay time.

2. A method according to claim 1, wherein the determining step includes determining that the second VPN node does not connect to the internal network through VPN communication, when the first response time and the second response time are constant regardless of the difference between the first delay time and the second delay time.

3. A method according to claim 1, wherein one of the first delay time and the second delay time is "0" sec.

4. A method according to claim 1, wherein the first response time, when the second VPN node connects to the internal network through VPN communication, includes a time for the first response request packet to reach the second VPN node through the first VPN nodes and the relay apparatus, a time for the first response packet transmitted from the second VPN node to reach the detecting apparatus through the relay apparatus and the first VPN nodes, and the first delay time.

5. A VPN (Virtual Private Network) communication detecting apparatus for detecting VPN communication between a first VPN node and a second VPN node, the first VPN node being on an internal network and the second VPN node being on an external network, the VPN communication detecting apparatus which connects to the internal network comprising:

a processor;

a memory coupled to the processor;

code for transmitting a first response request packet to the second VPN node via a first VPN node, code for receiving a first request VPN packet from the first VPN node, the first response VPN packet encapsulating and encrypting the first response request packet, the payload of the first request VPN packet not readable by the VPN communication detecting apparatus;

code for delaying at least one of packets passing through the VPN communication detecting apparatus by a first delay time, the at least one of packets each transmitting from one of the internal network and the external network to the other of the internal network and the external network;

code for receiving a first response packet from the second VPN node in response to the first response request packet;

code for receiving a first VPN response packet from the second node, the payload of the first response VPN packet not readable by the detecting apparatus and forwarding the first VPN response packet to the first node, wherein the first node de-encapsulates and decrypts the first VPN response packet to generate the first response packet;

code for receiving the first response packet from the first VPN node;

code for measuring a first response time which is from a first time point when the first response request packet is transmitted to a second time point when the first response packet is received and storing the first response time;

code for transmitting a second response request packet to the second VPN node via a first VPN node, code for receiving a second request VPN packet from the first VPN node, the second request VPN packet encapsulating and encrypting the second response request packet, the payload of the second request VPN packet not readable by the VPN communication detecting apparatus;

code for delaying at least one of packets passing through the VPN communication detecting apparatus by a second delay time, the at least one of packets each transmitting from one of the internal network and the external network to the other of the internal network and the external network;

code for receiving a second response packet from the second VPN node in response to the second response request packet;

code for receiving a second VPN response packet from the second node, the payload of the first response VPN packet not readable by the detecting apparatus and forwarding the second VPN response packet to the first node, wherein the first node de-encapsulates and decrypts the second VPN response packet to generate the second response packet;

code for receiving the second response packet from the first VPN node;

code for measuring a second response time which is from a third time point when the second response request packet is transmitted to a fourth time point when the second response packet is received and storing the second response time; and code for determining, based on a correlation between the first and second delay time inserted and the first and second response time measured, whether the second VPN node connects to the internal network through the VPN communication.

6. An apparatus according to claim 5, wherein one of the first delay time and the second delay time is "0" sec.

7. An apparatus according to claim 5, wherein the code for determining determines that the second VPN node does not connect to the internal network through the VPN communication, when the response time is constant regardless of the first and second delay time inserted.

8. An apparatus according to claim 5, wherein the code for delaying delays a test target packet of the at least one of packets which is specified by attribute information including at least one of a destination MAC address, a transmission source MAC address, a destination IP address, a transmission source IP address, a protocol number, a destination port number, and a transmission source port number.

9. An apparatus according to claim 8, wherein the code for determining determines that the test target packet is a packet for the VPN communication when the second VPN node is determined to connect through the VPN communication.

10. An apparatus according to claim 8, wherein the code for delaying includes: code for acquiring the attribute information of each of the packets, a memory to store the attribute information of the each of the packets, and code for selecting the test target packet based on the attribute information of the each of the packets stored in the memory.

* * * * *